United States Statutory Invention Registration [19]

[11] Reg. Number: H760

Ogawa [43] Published: Apr. 3, 1990

[54] SILVER HALIDE PHOTOGRAPHIC MATERIALS

[75] Inventor: Tadashi Ogawa, Kanagawa, Japan

[73] Assignee: Fuji Photo Film Co., Ltd., Japan

[21] Appl. No.: 292,870

[22] Filed: Jan. 3, 1989

[30] Foreign Application Priority Data

Jan. 6, 1988 [JP] Japan ..... 63-001064

[51] Int. Cl.[4] ..... G03C 1/06

[52] U.S. Cl. ..... 430/264; 430/567; 430/569; 430/570; 430/576

[58] Field of Search ..... 430/567, 568, 569

[56] References Cited

U.S. PATENT DOCUMENTS 4,820,624 4/1989 Hasebe et al. ..... 430/567

FOREIGN PATENT DOCUMENTS 273404 12/1987 European Pat. Off. .

273429 12/1987 European Pat. Off. .

273430 12/1987 European Pat. Off. .

*Primary Examiner*—Matthew A. Thexton

*Assistant Examiner*—Philip Tucker

*Attorney, Agent, or Firm*—Sughrue, Mion, Zinn, Macpeak & Seas

[57] ABSTRACT

Photosensitive materials which have a high speed and which exhibit little pressure desensitization and pressure fogging are obtained by means of this invention.

28 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC MATERIALS

FIELD OF THE INVENTION

This invention concerns silver halide photographic materials and, more precisely, it concerns silver halide photographic materials which have high speed and gradation, and which have excellent pressure resisting properties.

BACKGROUND OF THE INVENTION

The printing process and the development processing operations have been shortened and speeded up with the photosensitive materials used for prints in recent years, and increasingly strong demands have arisen for higher speeds, increased processing stability and increased strength for handling purposes.

The most basic way of increasing the speed of a silver halide emulsion is to increase the grain size and thereby increase the amount of light which is adsorbed per grain. In the case of a dye sensitized emulsion, this is done in such a way that the light is absorbed by the dye such that the photoelectrons are transmitted to the silver halide and there is a link with the latent image formation. However, these methods do not always give satisfactory results, and increasing grain size impedes any speeding up of the development process. Also with dye sensitization, not only is development and desilvering impeded but, under normal conditions, there is little latitude for increasing speed by increasing the amount of dye sensitizing agent etc. Hence, the ability to increase the speed of silver halide grains without increasing the size of the grains and without increasing the amount of sensitizing dye would be very useful. The methods known as chemical sensitization methods are typical of the methods which are used for this purpose, and the known methods include those in which sulfur sensitizing agents such as sodium thiosulfate are used, those in which gold sensitizers such as potassium chloroaurate are used, those in which reduction sensitizing agents such as stannous chloride are used, and those in which these types of sensitization are used jointly. The speed which can be attained with these various methods of chemical sensitization is governed by the type of sensitizing agent and the amount which is added, and by the method used for making the addition and the composition, but the details have not yet been clarified, and it is known that different results arise according to the nature of the silver halide grains themselves prior to chemical sensitization. For example, it has been disclosed in "The Journal of Photographic Science", 14, 181 (1966) that differences arise with sulfur sensitization depending on the crystal habit of the silver halide grains, but it is noted on pages 249 to 256 of volume 23 (1975) of the same journal that the crystal habit of the grains, including reduction sensitization, may fulfill some role in latent image formation. Furthermore, the types of halogen from which the emulsion grains are formed, crystal habits, and the effect on the speed and fogging of sulfur sensitization and gold/sulfur sensitization on these materials have been discussed in "Photographic Science and Engineering" 28, 146 (1984). However, these reports only describe the effect of the nature of the silver halide emulsion grains on chemical sensitization and photographic speed and they give no indication of techniques or methods for responding to the demands for higher speeds and handling stability at the commercial level of the type referred to earlier.

Methods of realizing an effective increase in speed without increasing the silver halide grain size have been anticipated in the silver halide photographic materials as described above. When speed is increased in this way then further improvements in stability in processing and robustness in handling can also be anticipated.

The method of forming grains by so-called halogen exchange disclosed in JP-B-No. 50-36978 is one known method of increasing the sensitivity of silver halides. (The term "JP-B" as used herein means an examined Japanese patent publication.)

The silver halide emulsions formed using this method are characterized by having a higher speed and by having a reduced tendency to fogging as a result of the application of mechanical pressure. However, while the emulsions do have these distinguishing features, the inventors have discovered that they are accompanied by serious disadvantages. Thus, not only is the tendency towards fogging on the application of mechanical pressure reduced, but when parts to which pressure has been applied are exposed to light there is a marked loss of sensitivity. The extent of halogen exchange can be reduced in order to minimize this desensitization due to pressure, but in such cases fogging is liable to result from the application of pressure. Thus, there is a problem with both fogging and desensitization due to pressure and the two are incompatible. Moreover, it has been discovered that gradation is softened in halogen exchanged emulsions in which the extent of halogen exchange has been reduced.

Furthermore, the inventors have previously disclosed emulsions for which halogen exchange has been carried with mono-disperse emulsions using water soluble bromides in the presence of a cyanine dye, and when compared to the emulsions disclosed in JP-B-No. 50-36978, the emulsions obtained in this way were better in that they were excellent in respect of high speed, pressure desensitization and pressure fogging, but the development of a further technique was required to achieve more perfect pressure characteristics and high speed and high contrast.

Hence, this invention represents progress in this direction and it is intended to provide stable silver halide emulsions which have high speed and high contrast. In more practical terms, the invention is intended to provide a method for the manufacture of silver halide emulsions which, when chemically sensitized, have a high speed and high contrast and which have excellent pressure characteristics, and to provide silver halide photographic materials which contain these emulsions.

SUMMARY OF THE INVENTION

The object of the invention has been realized by means of a silver halide photographic material wherein an essentially silver iodide free silver chloride, silver bromide or silver chlorobromide emulsion obtained: (1) by recrystallization of from 0.3 to 15 mol % of total silver halide using fine crystals of a sparingly soluble bromide, chloride or chlorobromide under conditions in which at least one of a simple cyanine dye, carbocyanine dye or dicarbocyanine dye is present on the surface of the silver halide grains in a silver halide emulsion which has a grain size distribution such that the variation coefficient is not more than 0.25, and (2) by chemical sensitization, is present in at least one emulsion layer on a support.

DETAILED DESCRIPTION OF THE INVENTION

The sparingly soluble bromides, chlorides or chlorobromides are metal compounds which are not liable to release bromide ions or chloride ions in aqueous solution, and those used in this invention are compounds of which the solubility is not more than 1 gram in 100 grams of water at 20° C. Those which have a solubility of not more than 0.2 gram in 100 grams of water at 20° C. are preferred. They include, for example, an iridium salt, a gold salt, a mercury salt, a thallium salt, a copper salt, a lead salt, a platinum salt, a palladium salt, and a rhodium salt. Actual examples include silver bromide, irridium monobromide, irridium dibromide, irridium tribromide, aurous bromide, mercurous bromide, mercuric bromide, thallous bromide, cuprous bromide, lead bromide, niobium tribromide, platinous bromide, platinic bromide, palladous bromide, boron tribromide, molybdenum dibromide, molybdenum tribromide, anhydrous rhodium tribromide or co-salts or complex salts which contain two or more of these bromides, or mixtures of these bromides, and the corresponding compounds for chlorides and chlorobromides. The addition of mixtures of these compounds is preferred. In cases where mixed crystals (e.g., with silver salt) are formed, the mixed crystal itself should be sparingly soluble but the mixed crystals may be formed from a sparingly soluble salt and a readily soluble salt.

For example, silver bromide and readily soluble irridium salts form mixed crystals and these should be sparingly soluble.

In this invention the recrystallization must be achieved by the addition of sparingly soluble bromide, chloride or chlorobromide fine crystals and so the silver halide grains prior to recrystallization preferably contain a silver salt of a different halogen composition or they have a different grain size so that a sparingly soluble silver salt can be formed by recrystallization. The silver chloride content of the emulsion prior to recrystallization can have any value from 0 mol % to 100 mol %, but a silver chloride content of at least 4 mol % is desirable. The amount of the sparingly soluble bromide, chloride or chlorobromide which is added cannot be less than the amount of silver salt which is to be recrystallized, but it may be more than this amount. The amount added must be within the range of from 0.3 mol % to 15 mol % with respect to total silver halide. Preferably, the amount added is within the range from 0.6 mol % to 12 mol %, more preferably from 0.6 mol % to 9 mol %, and most preferably from 0.6 mol % to 6 mol %. Thus, the effect of the addition is difficult to discern if the amount added is less than 0.3 mol % while the addition of more than 15 mol % results in a marked increase in the desensitization due to pressure mentioned earlier and this does not provide the desired result. No particular limits are set for the temperature of the emulsion during halogen exchange or recrystallization, but a temperature of not more than 70° C. is preferred. Most desirably, the temperature is not more than 60° C.

In the preferred embodiments of the present invention, there are cases where (a) the fine crystal is a sparingly soluble chlorobromide and the surface of the silver halide grain which is subjected to recrystallization is a silver chlorobromide, (b) the fine crystal is a sparingly soluble chlorobromide and the surface of the silver halide grain which is subjected to recrystallization is a silver chloride, (c) the fine crystal is a sparingly soluble bromide and the surface of the silver halide grain which is subjected to recrystallization is a silver chlorobromide, and (d) the fine crystal is a sparingly soluble chloride and the surface of the silver halide grain is a silver chloride or a silver chlorobromide. Furthermore, there is a case where the difference between the silver bromide content of the silver halide grain which is subjected to recrystallization and the bromide content of the sparingly soluble fine crystal is at least 10 mol %.

The recrystallization in this invention is carried out in the presence of simple cyanine dyes, carbocyanine dyes or dicarbocyanine dyes.

These cyanine dyes can be represented by the general formula [I] below (the position of the double bonds moves according to the resonance structure):

General Formula [I]

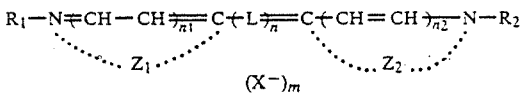

In this formula, L represents a methine group or a substituted methine group, $R_1$ and $R_2$ each represent an alkyl group or a substituted alkyl group, $Z_1$ and $Z_2$ each represent a group of atoms which forms a nitrogen containing five or six membered heterocyclic nucleus, X represents an anion, n represents 1, 3 or 5, $n_1$ and $n_2$ each represent 1 or 2 ($n_1=n_2=0$ when $n=5$, and $n_1$ or $n_2=0$ when $n=3$), and m represents 0 or 1 (0 when an intramolecular salt is formed). Furthermore, when n is 5 the L groups may be joined together to form a substituted or unsubstituted five or six membered ring.

The cyanine dyes which can be represented by the general formula [I] are described in detail below.

The substituent groups for the substituted methine groups represented by L are lower alkyl groups (for example, methyl, ethyl) and aralkyl groups (for example, benzyl, phenethyl), etc.

The alkyl groups (residual groups) represented by $R_1$ and $R_2$ may be linear chain, branched chain or cyclic alkyl groups. No particular limit is set for the number of carbon atoms, but it is preferably from 1 to 8, and more preferably from 1 to 4. Examples of substituent groups for the alkyl groups include sulfonic acid groups, carboxylic acid groups, hydroxyl groups, alkoxyl groups, acyloxy groups and aryl groups (for example, phenyl) and these groups may be bonded to the alkyl groups individually or in combinations of two or more groups. Furthermore, the sulfonic acid groups and the carboxylic acid groups can form salts with alkali metal ions or quaternary ions of organic amines etc. Here, the term "combinations of two or more groups" includes cases in which the groups are each bonded individually to the alkyl group and cases in which the groups are linked together and bonded to the alkyl group. Examples of the latter case include sulfoalkoxyalkyl groups, sulfoalkoxyalkoxyalkyl groups, carboxyalkoxyalkyl groups, and sulfophenylalkyl groups.

A methyl group, ethyl group, n-propyl group, butyl group, pentyl group, vinylmethyl group, 2-hydroxyethyl group, 4-hydroxybutyl group, 2-acetoxyethyl group, 3-acetoxypropyl group, 2-methoxyethyl group, 4-methoxybutyl group, 2-carboxyethyl group, 3-carboxypropyl group, 2-(2-carboxyethoxy)ethyl group, 2-sulfoethyl group, 3-sulfopropyl group, 3-sulfobutyl group, 4-sulfobutyl group, sulfopentyl group, 2-hydroxy-3-sulfopropyl group, 2-(3-sulfopropoxy)ethyl group, 2-acetoxy-3-sulfopropyl group, 3-methoxy-2-(3-sulfopropoxy)propyl group, 2-[2-(sulfopropoxy)ethoxy]ethyl group, 2-hydroxy-3-(3'-sulfopropoxy)propyl group, etc. are typical examples of the groups represented by $R_1$ and $R_2$.

The preferred $R_1$ and $R_2$ include an ethyl, n-propyl, butyl, pentyl, sulfoethyl, sulfopropyl, sulfobutyl, and sulfopentyl group.

Typical examples of the nitrogen containing heterocyclic nuclei formed by $Z_1$ or $Z_2$ include oxazole nucleus, thiazole nucleus, selenazole nucleus, imidazole nucleus, pyridine nucleus, oxazoline nucleus, thiazoline nucleus, selenazoline nucleus, imidazoline nucleus and those nuclei in which these nuclei are condensed with a benzene ring, naphthalene ring or other saturated or unsaturated carbocyclic ring, and substituent groups (for example, alkyl, trifluoromethyl, alkoxycarbonyl, cyano, carboxylic acid, carbamoyl, alkoxy, halogen atoms, aryl, acyl, hydroxyl), can be bonded onto these heterocyclic rings as substituent groups.

The preferred $Z_1$ and $Z_2$ include a substituted benzoxazole nucleus, a substituted benzothiazole nucleus, and a substituted benzoselenazole nucleus.

Cl−, Br−, I−, $SO_4^{2-}$, $NO_3^-$, $ClO_4^-$, p-toluenesulfonic acid anion, etc. can be cited as anions which can be represented by X.

The preferred X includes Br−, I−, and p-toluenesulfonic acid anion.

Actual examples of cyanine dyes which can be represented by the general formula [I] are listed below.

D-1

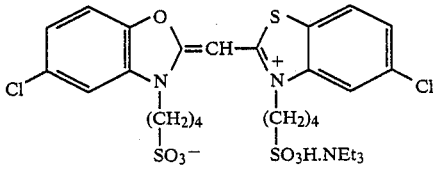

D-2

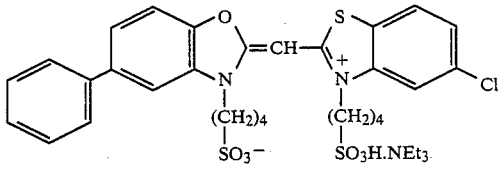

D-3

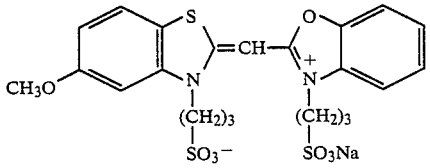

D-4

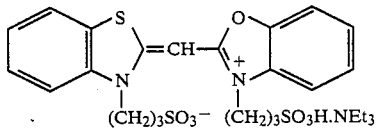

D-5

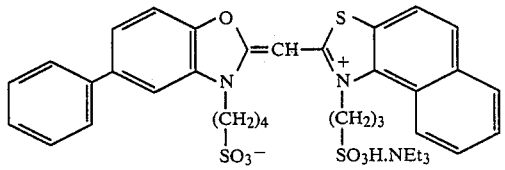

D-6

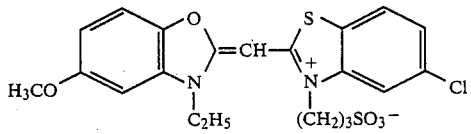

D-7

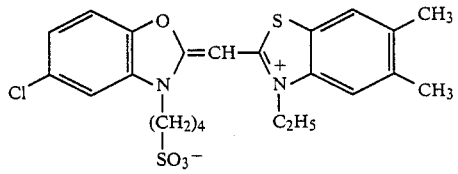

-continued
D-8
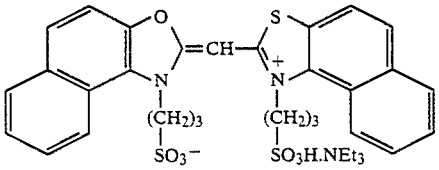
D-9
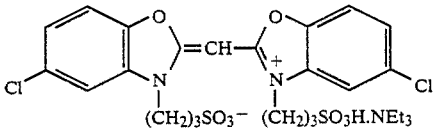
D-10
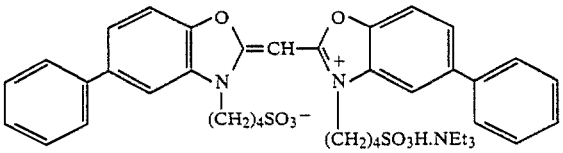
D-11
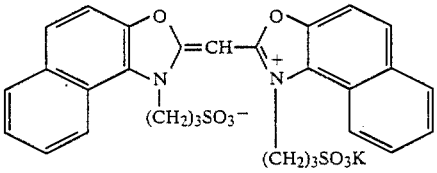
D-12
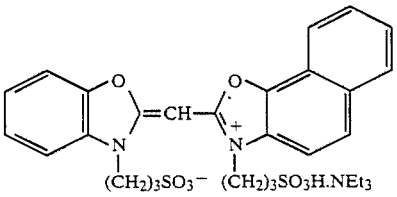
D-13
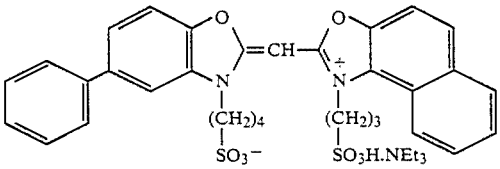
D-14
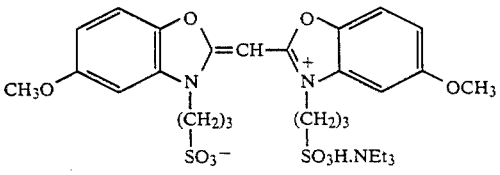
D-15
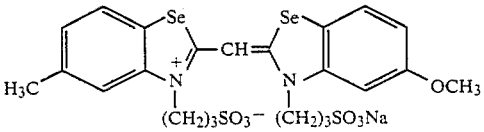
D-16
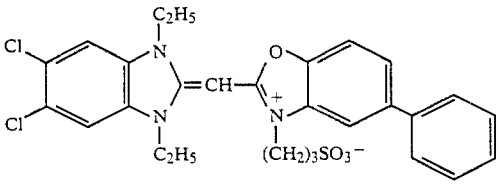

-continued
D-17
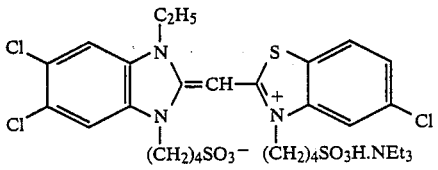
D-18
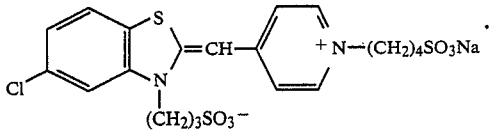
D-19
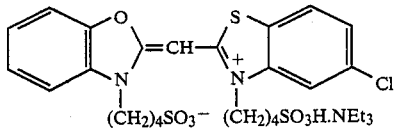
D-20
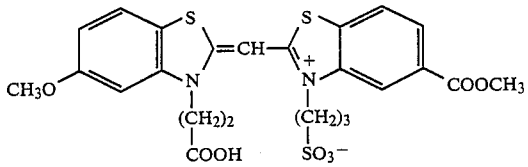
D-21
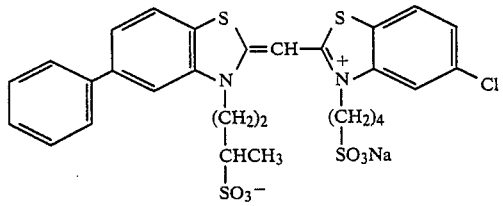
D-22
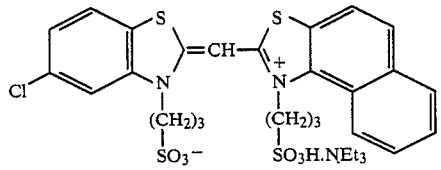
D-23
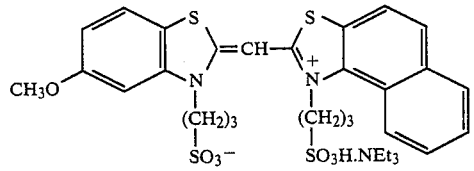
D-24
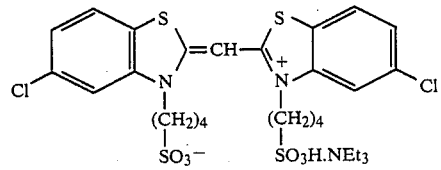
D-25
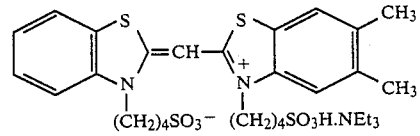

-continued
D-26
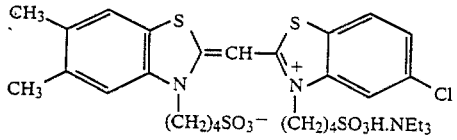
D-27
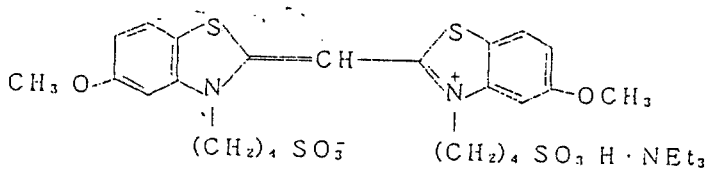
D-28
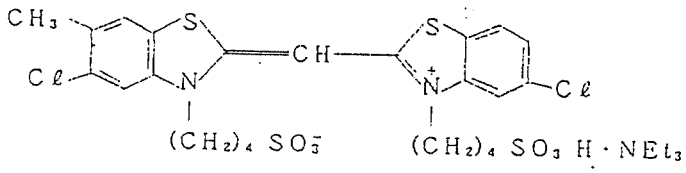
D-29
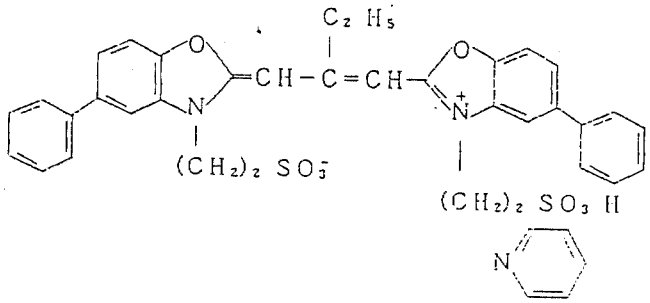
D-30
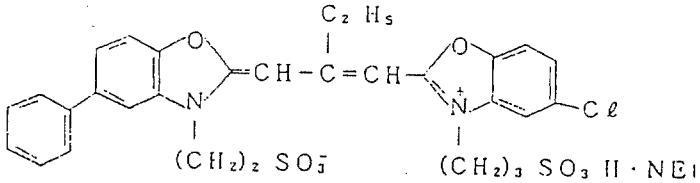
D-31
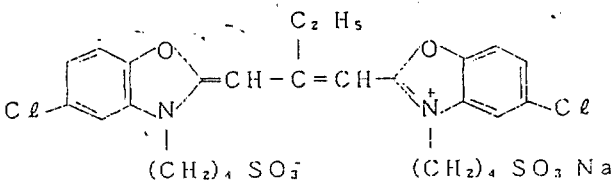
D-32
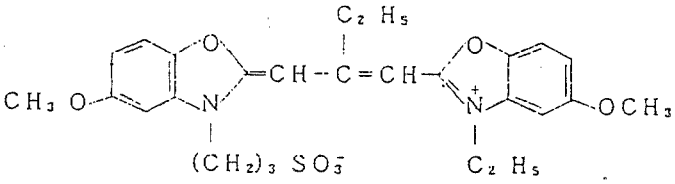

D-33
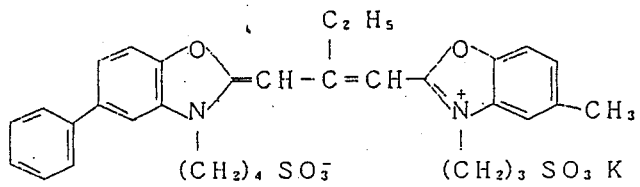
D-34
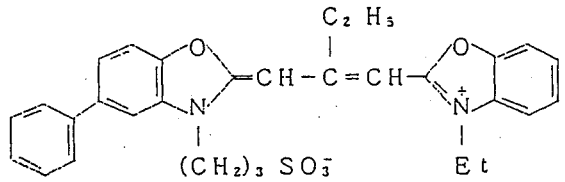
D-35
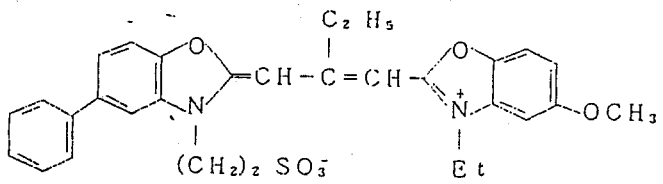
D-36
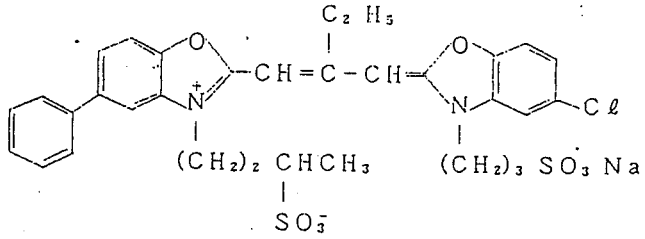
D-37
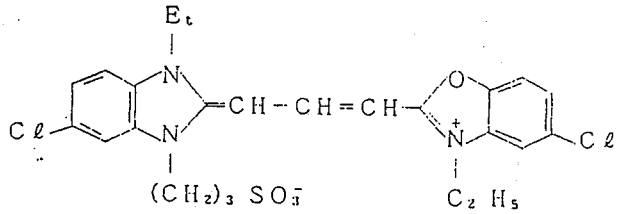
D-38
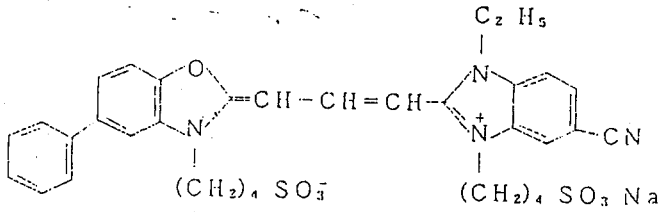

-continued
D-39
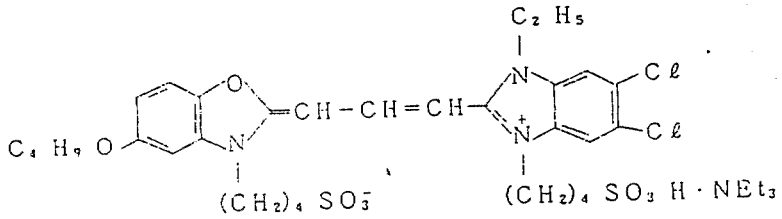
D-40
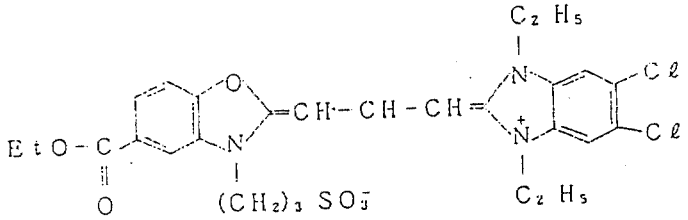
D-41
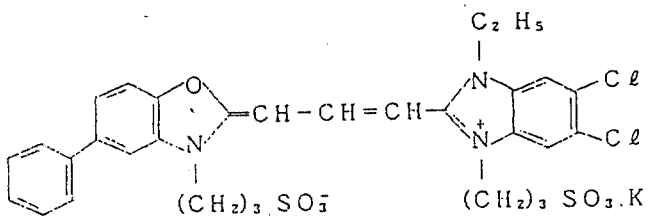
D-42
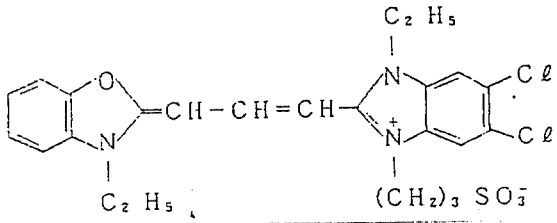
D-43
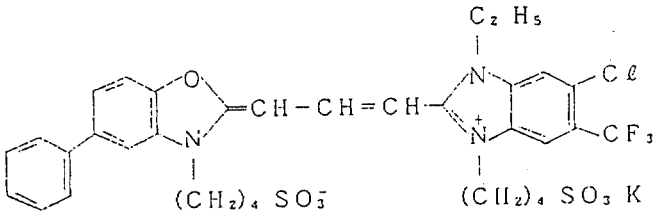
D-44
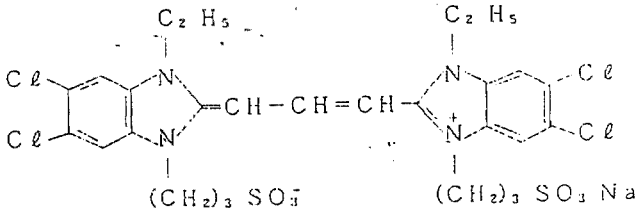

-continued
D-45
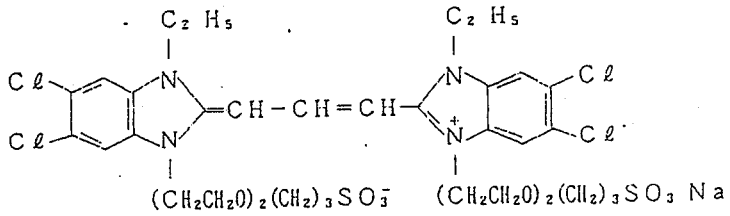
D-46
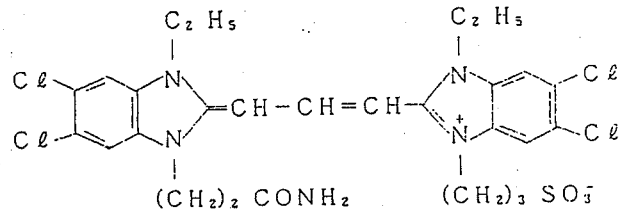
D-47
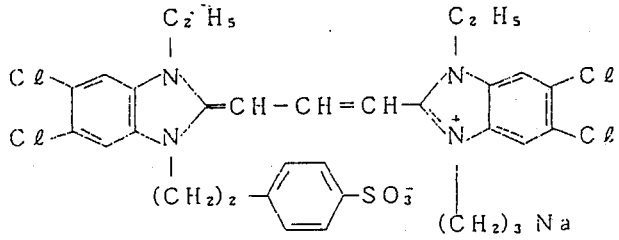
D-48
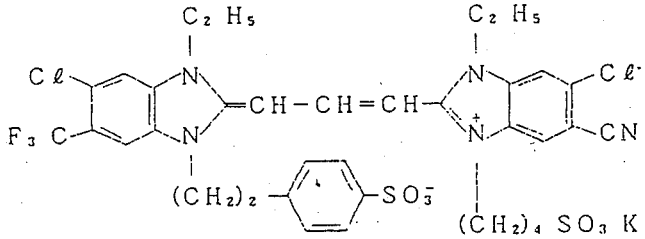
D-49
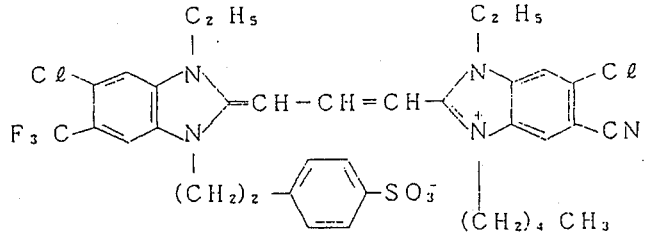

-continued
D-50
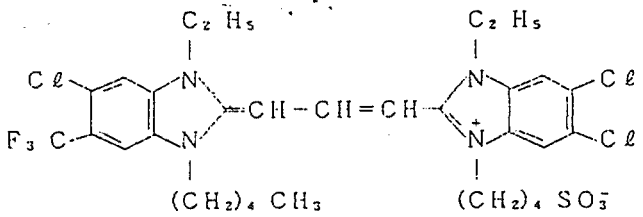
D-51
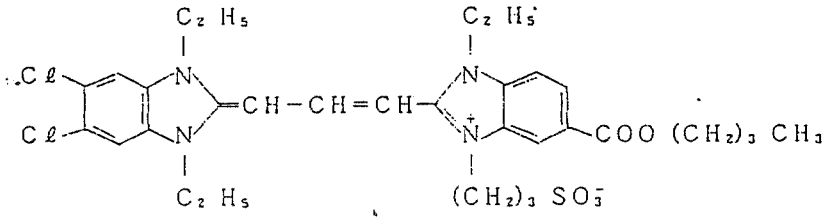
D-52
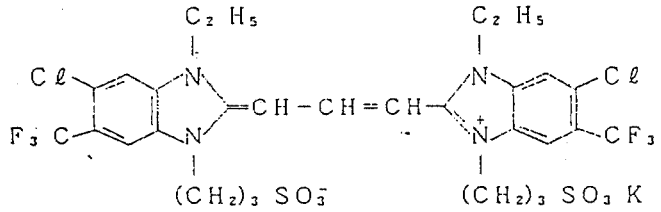
D-53
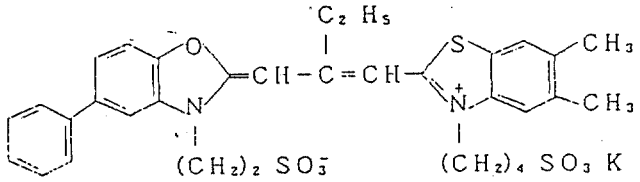
D-54
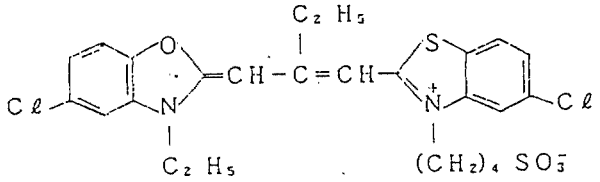
D-55
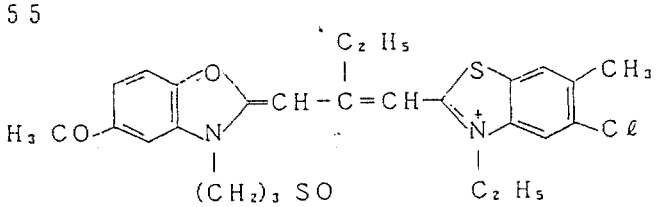

D-56
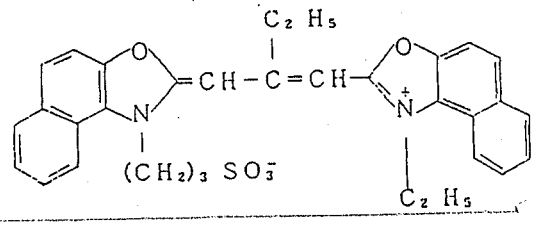
D-57
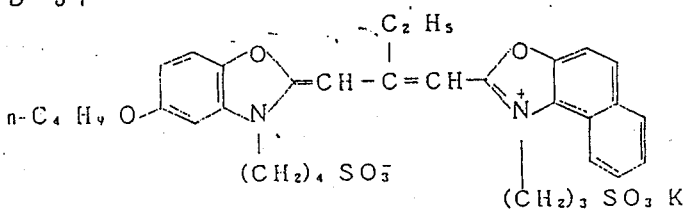
D-58
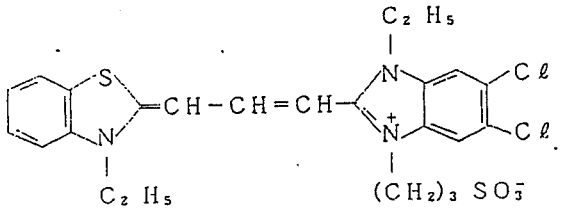
D-59
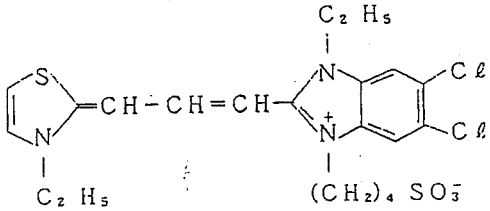
D-60
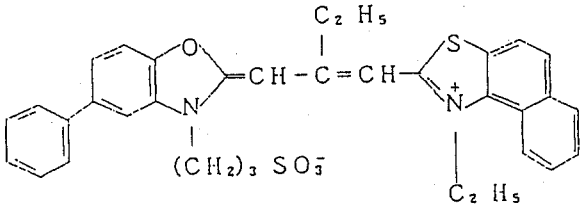
D-61
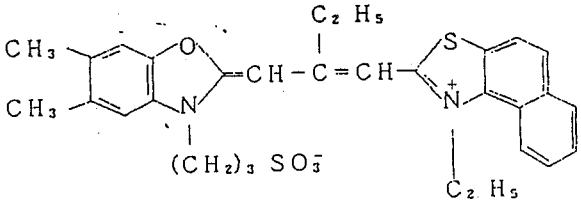

-continued
D-62
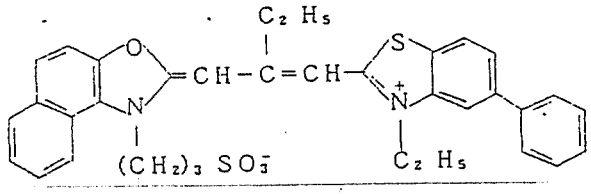
D-63
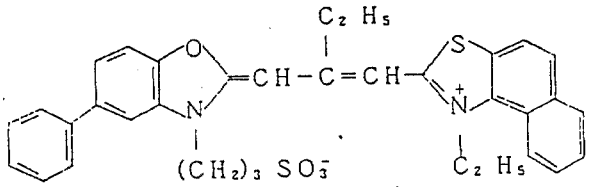
D-64
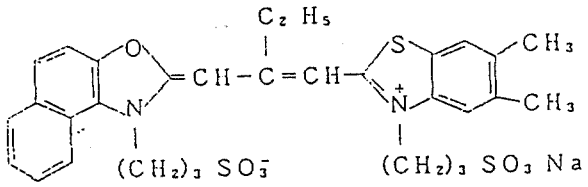
D-65
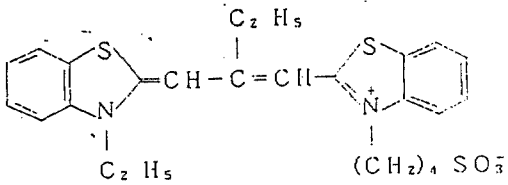
D-66
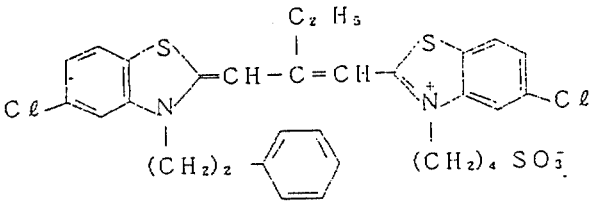
D-67
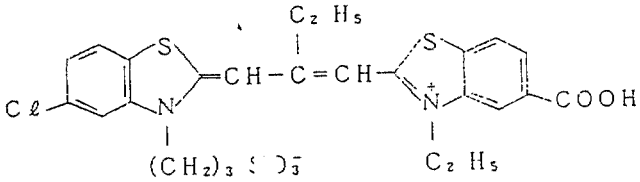

-continued
D-68
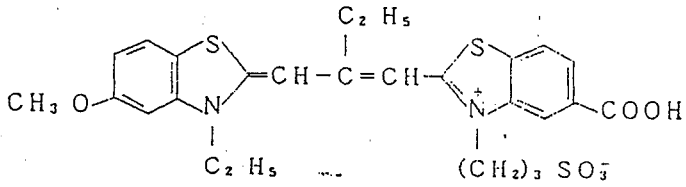
D-69
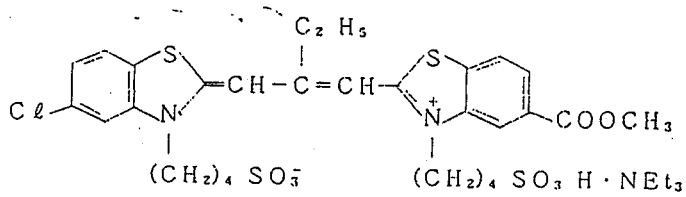
D-70
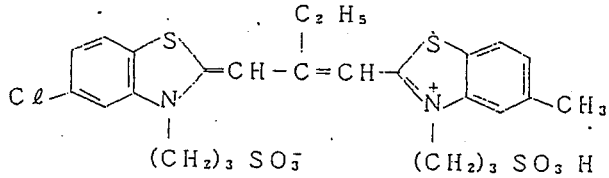
D-71
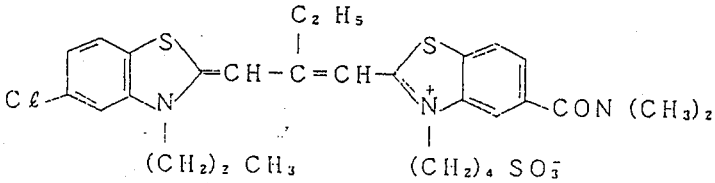
D-72
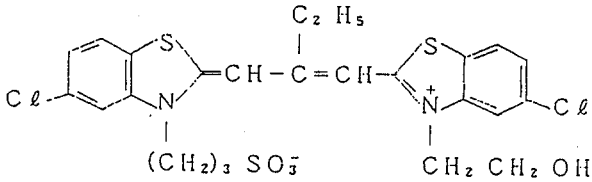
D-73
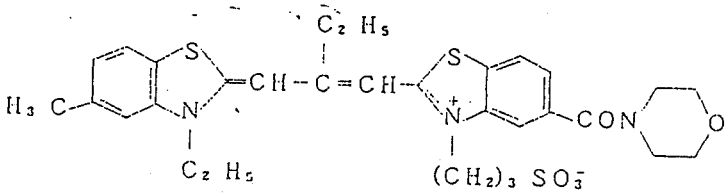

-continued
D-74
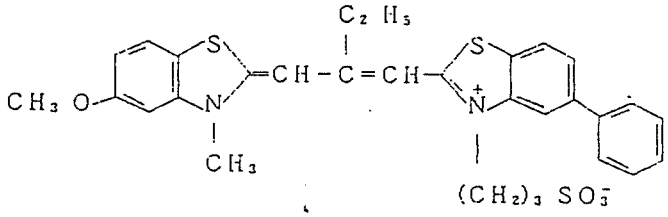
D-75
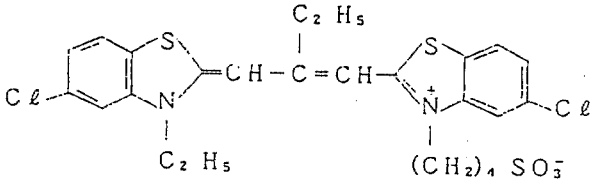
D-76
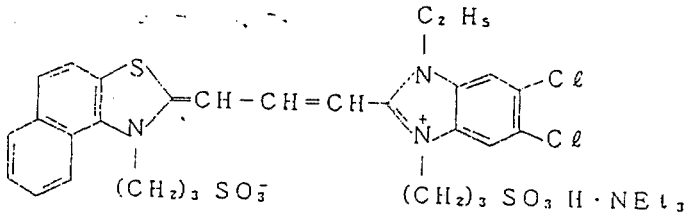
D-77
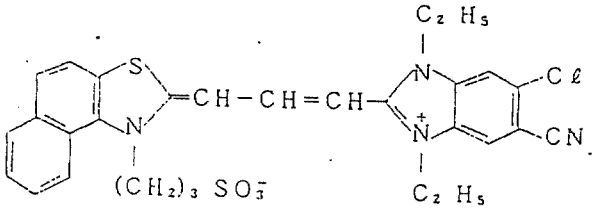
D-78
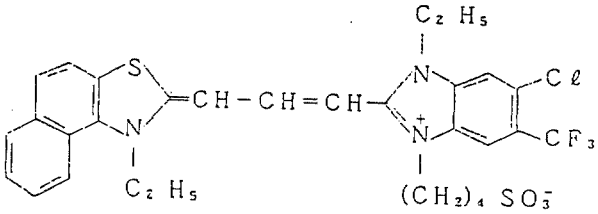
D-79
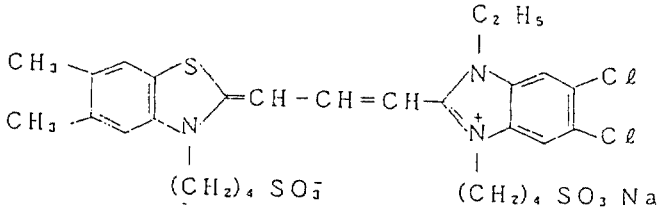

-continued
D-80
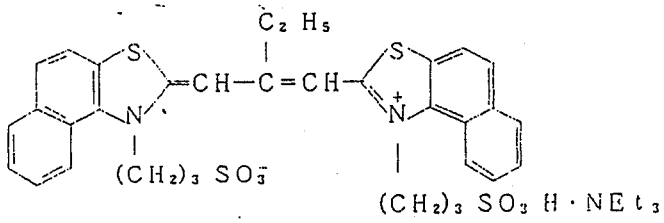
D-81
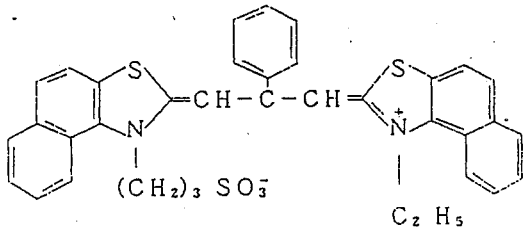
D-82
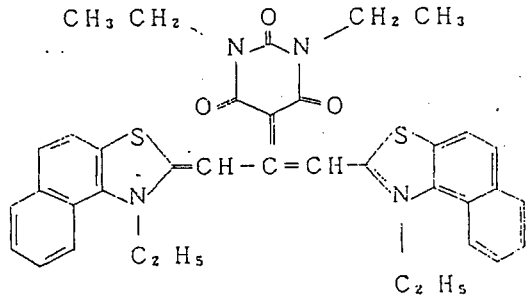
D-83
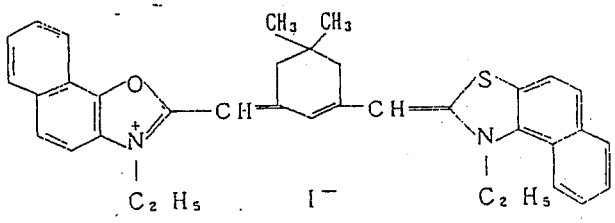
D-84
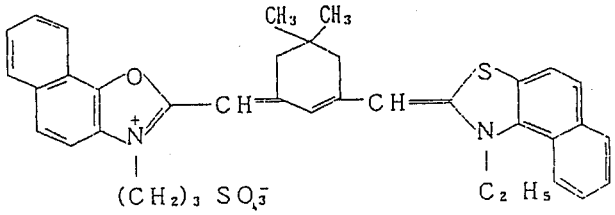

-continued
D-85
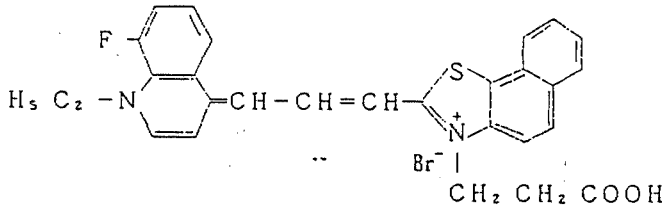
D-86
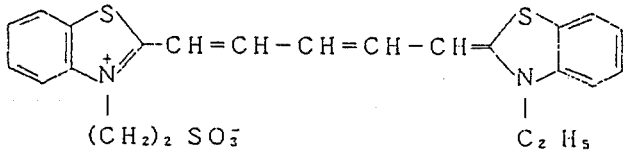
D-87
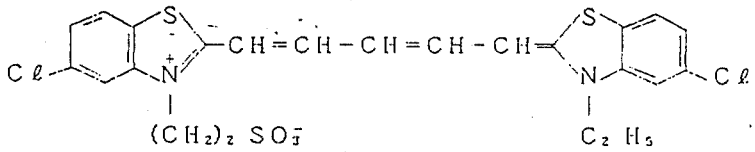
D-88
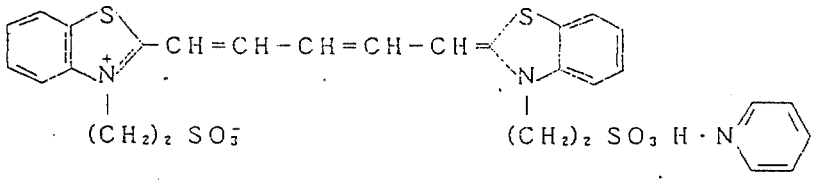
D-89
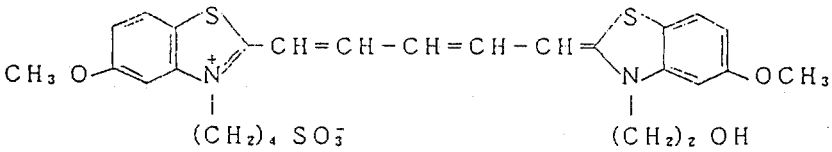
D-90
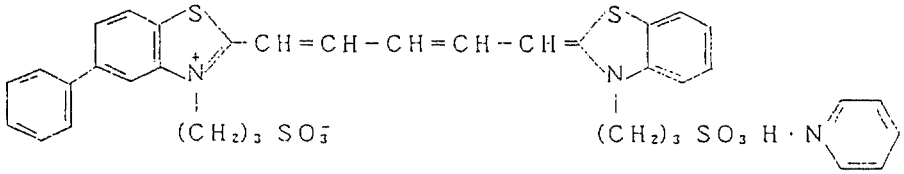

-continued
D-91
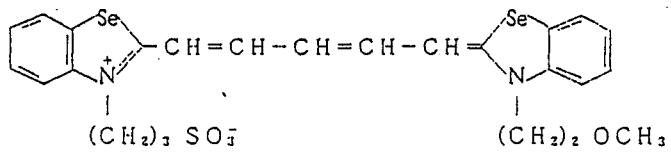
D-92
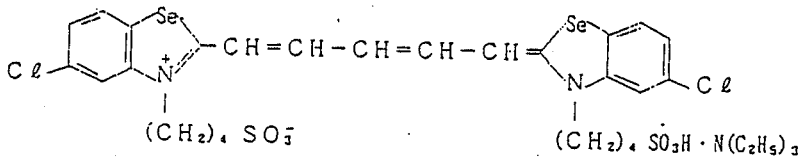
D-93
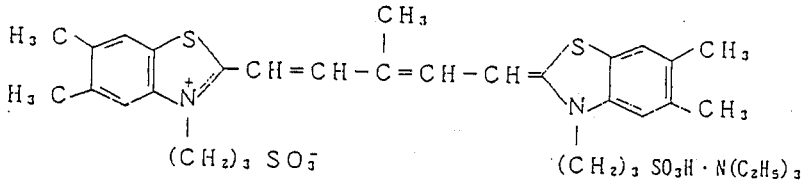
D-94
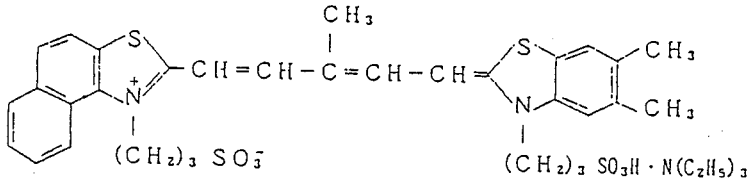
D-95
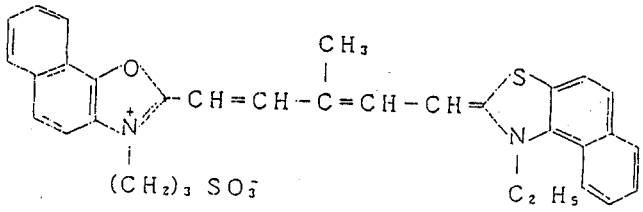
D-96
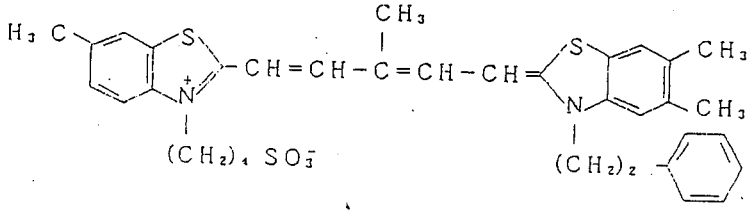

-continued
D-97
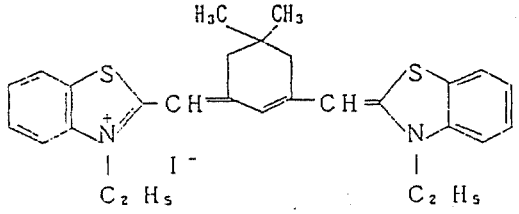
D-98
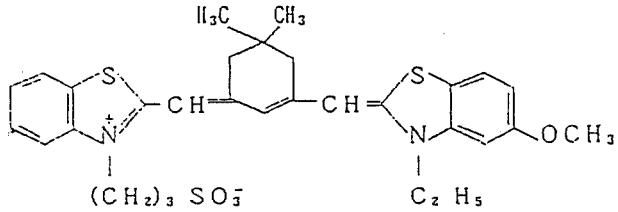
D-99
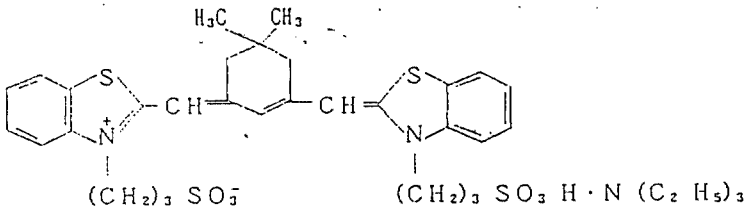
D-100
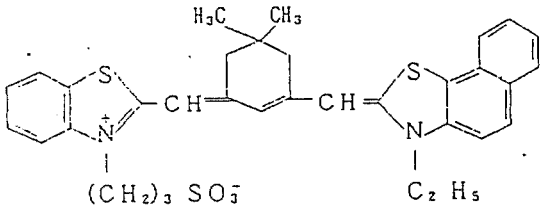
D-101
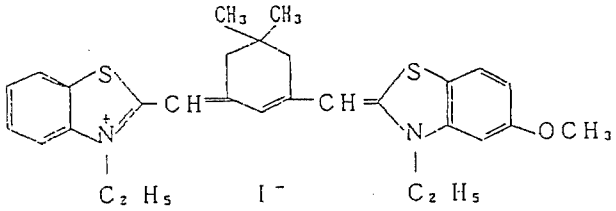
D-102
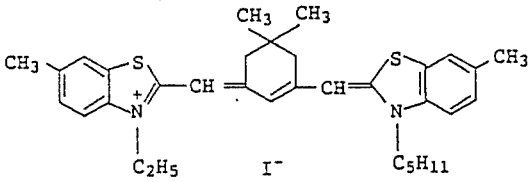
D-103
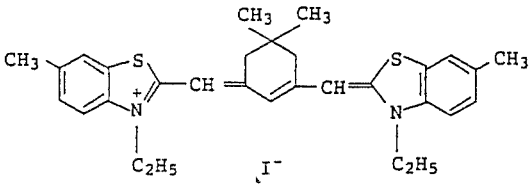

-continued

D-104

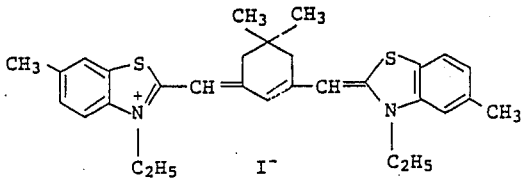

Those of these dyes which contain a benzothiazole nucleus or a benzoxazole nucleus are especially desirable.

Normally, methods in which the spectrally sensitizing dye is adsorbed on the surface of the grains after the silver halide grains have been formed completely are used to sensitize a silver halide emulsion spectrally. On the other hand, the possibility of reducing the amount of dye which is not adsorbed by adding a merocyanine dye during the precipitation and formation of the silver halide grains is disclosed in U.S. Pat. No. 2,735,766. Furthermore, a method in which spectrally sensitizing dye is added and adsorbed during the addition of the aqueous silver salt solution and the aqueous halide solution with which the silver halide grains are being formed was disclosed in JP-A-No. 55-26589 (the term "JP-A" as used herein signifies a published, unexamined, Japanese patent application). With both of these methods the spectrally sensitizing dye is introduced during the formation of the silver halide grains, which is to say at the stage where silver ions are being added in the presence of silver halide grains, and adsorption is strengthened in this way while the significance of this is lost with addition after grain formation has been completed.

In this invention, the cyanine dye may be added at any stage provided that it is adsorbed and present on the surface of the silver halide grains which have been formed at the stage where the recrystallization by means of a sparingly soluble bromide, chloride or chloro bromide is carried out. Hence, if the recrystallization is carried out immediately after grain formation the cyanine dye is preferably added during grain formation, but in cases where the recrystallization is carried out some time after grain formation the cyanine dye can be added after grain formation. Moreover, the addition of the cyanine dyes can be made sequentially with, simultaneously with, or after the addition of the sparingly soluble bromide, chloride or chlorobromide which is used for recrystallization provided that the addition is made before the completion of recrystallization. In such a case, the good methods are those in which the temperature of the system is kept low until the cyanine dye is added. The addition of the cyanine dye and the sparingly soluble bromide, chloride or chlorobromide can be concentrated over a short period of time or they can be added continuously over an extended period of time. Furthermore, the addition times can be partially overlapping. Furthermore, each substance added may be divided into two or more portions and added in parts, or materials which have been divided up in this way may be added alternately. The addition of the cyanine dye can be made by dissolving the dye in water, but addition in the form of a solution in a water soluble organic solvent such as an alcohol which has from 1 to 3 carbon atoms, or acetone, or in the form of a liquid obtained by means of a micellar dispersion with a surfactant, is preferred.

The amount of cyanine dye added is dictated by the type of spectral sensitization required, but in general it is determined by the amount of silver salt which is to be recrystallized and the recrystallization conditions. Normally it is added at a rate of from $1\times10^{-5}$ to $1\times10^{-2}$ mol, and preferably at a rate of from $3\times10^{-5}$ to $5\times10^{-3}$ mol, per mol silver halide in total.

The sparingly soluble bromides, chlorides or chlorobromides may be added in any form in this invention. Thus, they may be added to the system in the form of a powder or they can be added in the form of a dispersion.

The use of sparingly soluble bromides, chlorides of chlorobromide which have been formed by precipitation in a protective colloid such as gelatin for example using readily soluble metal salts and bromides, chlorides or chlorobromides which are readily soluble in water is preferred. The addition of sparingly soluble salts other than silver salts in the form of a gelatin dispersion in which mixed crystals with a silver salt have been formed is especially desirable.

In this invention, the emulsion which is to be subjected to halogen exchange in the presence of a cyanine dye must be an essentially silver iodide free silver chloride, silver bromide or silver chlorobromide emulsion which has a grain size distribution such that the variation coefficient is not more than 0.25%. The extent of the recrystallization varies between grains if the variation coefficient is larger than this level and the desired effect cannot be achieved. The variation coefficient is preferably not more than 0.2, more preferably it is not more than 0.15 and most preferably, it is not more than 0.10. The variation coefficient is explained in T. H. James, *The Theory of The Photographic Process,* 3rd ed. page 39 (1967). The silver halide emulsions used in the invention contain essentially no silver iodide at all or not more than 3 mol % of silver iodide. The emulsion grains prior to recrystallization which are used in the invention may have a uniform halogen composition throughout the whole of the grain, the halogen composition in the interior and surface layer may be different, or they may have a junction structure or a multi-phase structure. Furthermore mixtures of these types can be used. For example, silver chlorobromide grains which have different phases may be grains which have a nucleus or one or a plurality of layers within the grains which are richer in silver bromide than the average halogen composition. Conversely, they may be grains which have a nucleus or layers which are richer in silver chloride than the average halogen composition. In either case, the grains after recrystallization are silver halide grains of which at least part of the surface layer has a different chemical composition to the interior or other parts of the surface layer.

The average grain size of the silver halide (the average diameter of circles calculated on the basis of projected areas) is not more than 2.2μ but at least 0.1μ, and preferably not more than 1.2μ but at least 0.2.

Two or more silver halide emulsions of this invention of different grain size can be coated together in the same layer or lamination coated in separate layers as emulsion layers which have essentially the same color sensitivity in order to satisfy the gradation which is required of the photosensitive material. Mixtures and laminates with silver halide emulsions outside the scope of this invention can also be used.

The silver halide grains used in the invention preferably have a regular crystalline form, such as a cubic, octahedral, dodecahedral, tetradecahedral form etc., but grains which have an irregular crystalline form, such as a spherical form, and grains which have a complex crystalline form in which these forms are combined can also be used provided that the variation coefficient of the grain size distribution is not more than 0.25. The grains may be tabular grains, and emulsions in which tabular grains of which the value of the length/thickness ratio is at least 5, and preferably at least 8, account for at least 50% of the projected area of all the grains can be used in particular. The form of the grains after recrystallization differs somewhat from the original form but this difference is of no consequence. The emulsion grains which have been formed are preferably of the surface latent image type with which the latent image is formed principally on the surface of the grains.

The photographic emulsions which are used in the invention can be prepared using the method described in *Chemie et Physique Photographique,* by P. Glafkides, published by Paul Montel, 1967; in *Photographic Emulsion Chemistry,* by G. F. Duffin, published by Focal Press, 1966; and in *Making and Coating Photographic Emulsions,* by V. L, Zelikman et al., published by Focal Press, 1964 etc. That is to say, they can be prepared using the acid method, the neutral or the ammonia method and a one sided mixing method, a simultaneous mixing method or a combination of these methods can be used for the system by which a soluble silver salt is reacted with a soluble halide. Methods in which the grains are formed in the presence of an excess of silver ion (the so-called reverse mixing methods) can also be used. The method in which the pAg value of the liquid phase in which the silver halide is being formed is held constant, which is to say the controlled double jet method, can be used as one type of simultaneous mixing method. Silver halide emulsions of which the crystal form is regular and in which the grains are almost uniform can be obtained using this method.

The additives which can be used when preparing silver halide grains by means of this invention are described below.

Thus silver halide solvents such as, for example, ammonia, potassium thiocyanate, ammonium thiocyanate, thioether compounds (for example those disclosed in U.S. Pat. Nos. 3,271,157, 3,574,628, 3,704,130, 4,297,439 and 4,276,374 etc.), thione compounds (for example those disclosed in JP-A-No. 53-144319, JP-A-No. 53-82408 and JP-A-No. 55-77737 etc.) and amine compounds (for example those disclosed in JP-A-No. 54-100717 etc.) etc. can be used to control grain growth during the formation of silver halide grains in accordance with this invention.

Cadmium salts, zinc salts, thallium salts, irridium salts or complex salts thereof, rhodium salts or complex salts thereof, or iron salts or complex salts thereof may also be present during the course of the formation or physical ripening of the silver halide grains.

Sulfur sensitization can be carried out in accordance with the normal methods used for sulfur sensitization. That is to say, compounds which contain sulfur which can react with silver halide, for example thiosulfates, thioureas, mercapto compounds, rhodanines etc. can be used for this purpose. Details of the sulfur sensitization method have been disclosed in the specifications of U.S. Pat. Nos. 2,410,689 and 3,501,313, in West German Pat. No. 1,422,869, and in JP-B-No. 49-20533.

The sulfur sensitizing agent is preferably used at a rate within the range of from about $10^{-8}$ to $5\times10^{-4}$ mol per mol of silver halide.

Furthermore, other methods of sensitization can be used conjointly with sulfur sensitization.

That is to say, the reduction sensitization method in which reducing substances (for example stannous salts, amines, hydrazine derivatives, formamidinesulfinic acid, silane compounds) are used, and precious metal sensitization methods in which precious metal compounds (for example gold salts, or complex salts of metals of group VIII of the periodic table, such as platinum, irridium, lead etc.) are used, can be used for this purpose.

Reduction sensitization methods and precious metal sensitization methods have been disclosed in U.S. Pat. Nos. 2,399,083, 2,597,856, 2,597,915, 2,487,850 and 2,518,698, etc.

Various compounds can be included in the photographic emulsions which are used in the invention with a view to preventing the occurrence of fogging during the manufacture, storage or photographic processing of the photosensitive materials or with a view to stabilizing photographic performance. Thus many compounds which are known as anti-fogging agents or stabilizers, such as azoles, for example benzothiazolium salts, nitroindazoles, triazoles, benzotriazoles, benzimidazoles (especially the nitro and halogen substituted benzimidazoles); heterocyclic mercapto compounds, for example mercaptothiazoles, mercaptobenzothiazoles, mercaptobenzthiazoles, mercaptobenzimidazoles, mercaptothiadiazoles, mercaptotetrazoles (especially 1-phenyl-5-mercaptotetrazole), mercaptopyrimidines; heterocyclic mercapto compounds as indicated above which have water solubilizing groups such as carboxyl groups and sulfo groups, thioketone compounds, for example oxazolinethione; azaindenes, for example tetraazaindenes (especially 4-hydroxy substituted (1,3,3a,7)tetraazaindenes); benzenethiosulfonic acids and benzenesulfinic acids etc. can be added for this purpose.

Yellow couplers, magenta couplers and cyan couplers which couple with the oxidized form of a primary aromatic amine developing agent and form a yellow, magenta or cyan coloration respectively are normally used in cases where the photosensitive materials of this invention are used as color sensitive materials.

Of the yellow couplers which can be used in this invention, the use of the acylacetamide derivatives, such as the benzoylacetanilides and pivaloylacetanilides etc., is preferred.

Those of these compounds which can be represented by the general formulae [Y-1] and [Y-2] indicated below are ideal as yellow couplers.

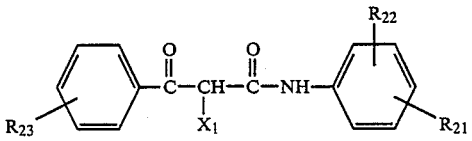

[Y-1]

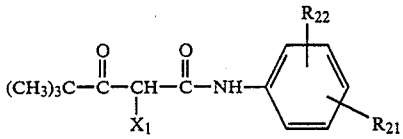

[Y-2]

In these formulae, $X_1$ represents a hydrogen atom or a coupling leaving group. $R_{21}$ represents a group which renders the molecule fast to diffusion which has a total number of from 8 to 32 carbon atoms, and $R_{22}$ represents a hydrogen atom, one or more halogen atoms, lower alkyl groups, or groups which render the molecule fast to diffusion which have a total number of from 8 to 32 carbon atoms. $R_{23}$ represents a hydrogen atom or substituent groups. In cases where there are two or more groups represented by $R_{23}$ these groups may be the same or different.

Details of pivaloylacetanilide type yellow couplers are given from line 15 of column 3 to line 39 of column 8 of the specification of U.S. Pat. No. 4,622,287 and from line 50 of column 14 to line 41 of column 19 of the specification of U.S. Pat. No. 4,623,616.

Details of benzoylacetanilide type yellow couplers have been disclosed in U.S. Pat. Nos. 3,408,194, 3,933,501, 4,046,575, 4,133,958 and 4,401,752 etc.

Typical examples of pivaloylacetanilide type yellow couplers include the compounds (Y-1) to (Y-39) disclosed in columns 37 to 54 of the specification of the aforementioned U.S. Pat. No. 4,622,287, and of these compounds the use of (Y-1), (Y-4), (Y-6), (Y-7), (Y-15), (Y-21), (Y-22), (Y-23), (Y-26), (Y-35), (Y-36), (Y-37), (Y-38) and (Y-39) is preferred.

The illustrative compounds (Y-1) to (Y-33) are given between column 19 and column 24 of the specification of the aforementioned U.S. Pat. No. 4,623,616, and of these compounds, those indicated as (Y-2), (Y-7), (Y-8), (Y-12), (Y-20), (Y-21), (Y-23) and (Y-29) are preferred.

Other preferred yellow couplers include typical example (34) noted in column 6 of the specification of U.S. Pat. No. 3,408,194, illustrative compounds (16) and (19) disclosed in column 8 of the specification of U.S. Pat. No. 3,933,501, illustrative compound (9) disclosed in columns 7 to 8 of the specification of U.S. Pat. No. 4,046,575, illustrative compound (1) disclosed in columns 5 to 6 of the specification of U.S. Pat. No. 4,133,958, illustrative compound 1 disclosed in column 5 of the specification of U.S. Pat. No. 4,401,752, and the compounds (a) to (g) set forth below.

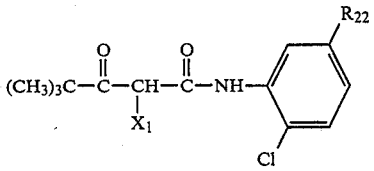

| Compound | $R_{22}$ | $X_1$ |
|---|---|---|
| a | $-COOCH(CH_3)COOC_{12}H_{25}$ | 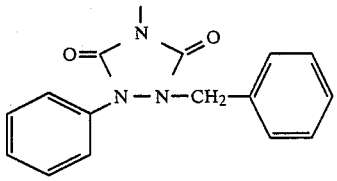 |
| b | $-COOCH(C_4H_9)COOC_{12}H_{25}$ | " |
| c | 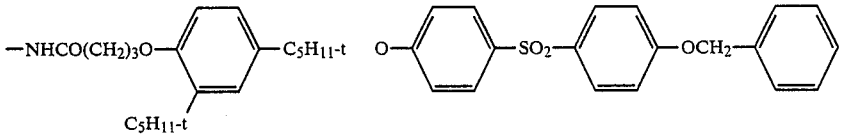 | |
| d | " | 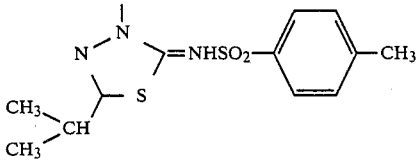 |
| e | " | 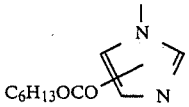 |

-continued

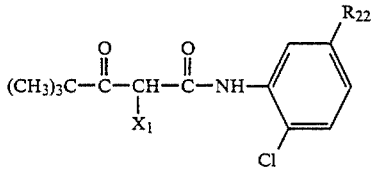

| Compound | $R_{22}$ | $X_1$ |
|---|---|---|
| f | $-NHSO_2C_{12}H_{25}$ | 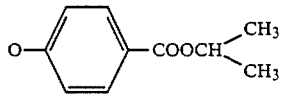 |
| g | $-NHSO_2C_{16}H_{33}$ | 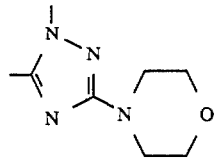 |

Those of the couplers described above in which the leaving atom is a nitrogen atom are especially desirable.

Furthermore, the oil protected type indazole based or cyanoacetyl based couplers, and preferably the 5-pyrazolone based couplers and the pyrazoloazole based couplers, such as the pyrazoloazoles, can be used as the magenta couplers which are used in the invention. The 5-pyrazolone based couplers which are substituted with an arylamino group or an acylamino group in the 3-position are preferred from the point of view of the hue of the colored dye and color forming density, and typical examples have been disclosed in U.S. Pat. Nos. 2,311,082, 2,343,703, 2,600,788, 2,908,573, 3,062,653, 3,152,896 and 3,936,015 etc. The nitrogen atom leaving groups disclosed in U.S. Pat. No. 4,310,691 and the arylthio groups disclosed in U.S. Pat. No. 4,351,897 are preferred as the leaving groups of two equivalent 5 pyrazolone based couplers. Furthermore, high color densities can be obtained with the 5-pyrazolone based couplers which have ballast groups disclosed in European Pat. No. 73,636.

The pyrazolobenzimidazoles disclosed in U.S. Pat. No. 3,369,879, and preferably the pyrazolo[5,1-c][1,2,4]triazoles disclosed in U.S. Pat. No. 3,725,067, the pyrazolotetrazoles disclosed in *Research Disclosure* 24220 (June 1984) and the pyrazolopyrazoles disclosed in *Research Disclosure* 24230 (June 1984) can be used as pyrazoloazole based couplers. All of the couplers mentioned above may take the form of polymeric couplers.

In practice, these compounds can be represented by the general formulae [M-1], [M-2] or [M-3] which are set forth below.

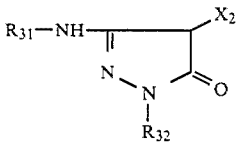

[M-1]

-continued

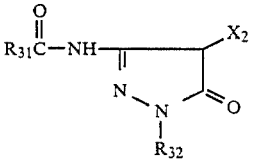

[M-2]

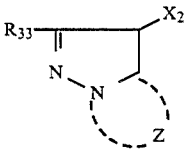

[M-3]

In these formulae $R_{31}$ represents a group which is fast to diffusion which has a total number of from 8 to 32 carbon atoms, and $R_{32}$ represents a phenyl group or a substituted phenyl group. $R_{33}$ represents a hydrogen atom or a substituent group. Z represents a group of nonmetal atoms required to form a five membered azole ring which has a nitrogen atoms in the 2 to 4 positions, and the azole ring may have substituent groups (including condensed rings). $X_2$ represents a hydrogen atom or a leaving group. Details of the substituent groups for $R_{33}$ and of the substituent groups for the azole ring have been disclosed, for example, from line 41 of column 2 to line 27 of column 8 of the specification of U.S. Pat. No. 4,540,654.

From among the pyrazoloazole based couplers the use of the imidazo[1,2-b]pyrazoles disclosed in U.S. Pat. No. 4,500,630 is preferred in view of the low absorption by the colored dye on the yellow side absorption and light fastness, and the use of the pyrazolo[1,5-b][1,2,4]triazoles disclosed in U.S. Pat. No. 4,540,654 is especially desirable.

Moreover, the use of the pyrazolotriazole couplers which have a branched alkyl group bonded directly to the 2-, 3- or 6-position of the pyrazolotriazole ring as disclosed in JP-A-No. 61-65245, the pyrazoloazole couplers which contain a sulfonamido group within the molecule as disclosed in JP-A-No. 61-65246, the pyrazoloazole couplers which have an alkoxyphenylsulfonamido ballast group as disclosed in JP-A-No. 61-147254, and the pyrazolotriazole couplers which have an alkoxy group or aryloxy group in the 6-position as disclosed in EP-A-No. 226849 is preferred.
Actual examples of these couplers are set forth below.
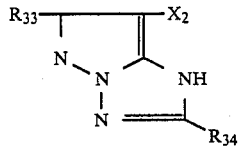
| Compound | $R_{33}$ | $R_{34}$ | $X_2$ |
|---|---|---|---|
| M-1 | $CH_3$— | 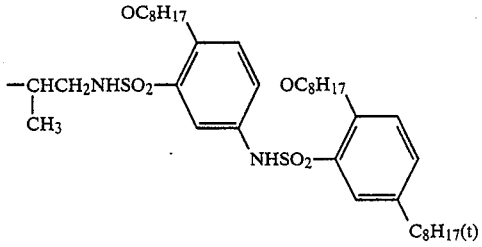 | Cl |
| M-2 | " | 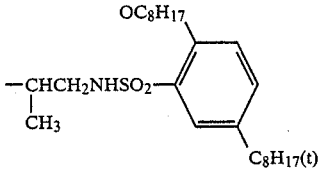 | " |
| M-3 | " | 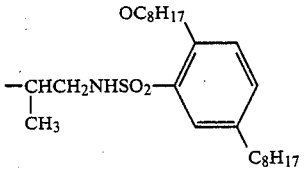 | 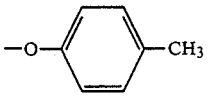 |
| M-4 | 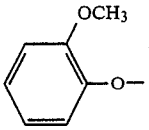 | 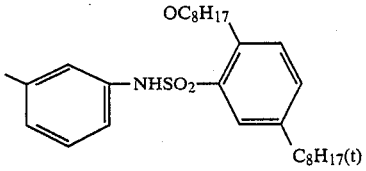 | 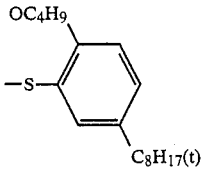 |
| M-5 | $CH_3$— | 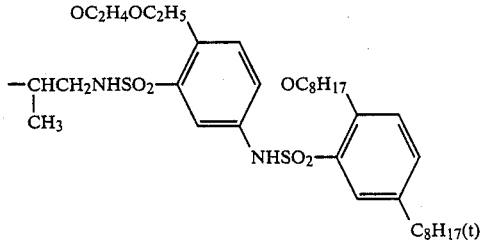 | Cl |
| M-6 | " | 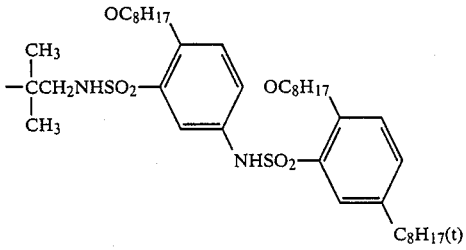 | " |

-continued
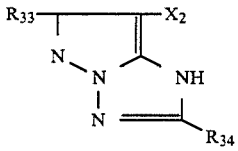
| Compound | $R_{33}$ | $R_{34}$ | $X_2$ |
|---|---|---|---|
| M-7 | 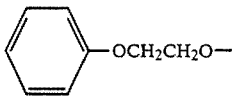 | 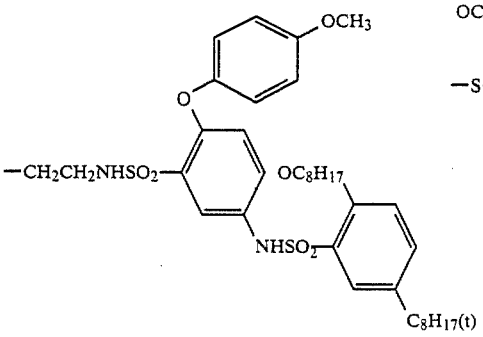 | 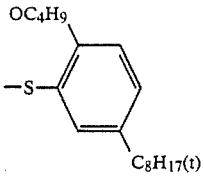 |
| M-8 | $CH_3CH_2O-$ | " | " |
| M-9 | 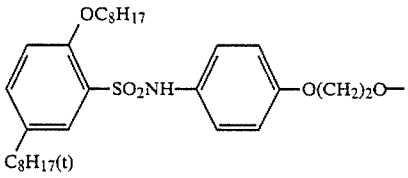 | 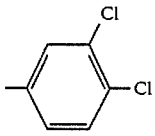 | " |
| M-10 | 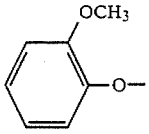 | 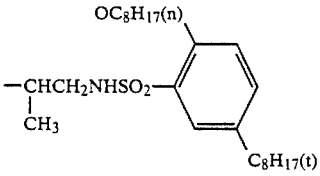 | Cl |
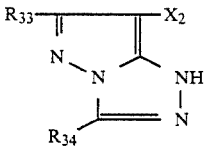
| Compound | $R_{33}$ | $R_{34}$ | $X_2$ |
|---|---|---|---|
| M-11 | $CH_3-$ | 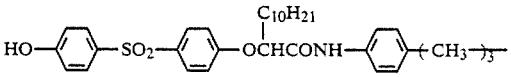 | Cl |
| M-12 | " | 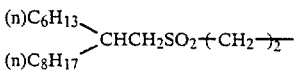 | " |
| M-13 | 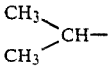 | 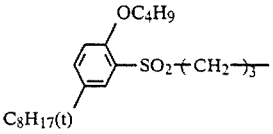 | " |
| M-14 | 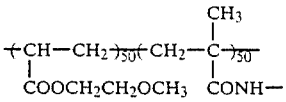 | 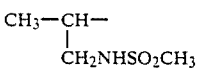 | " |

-continued

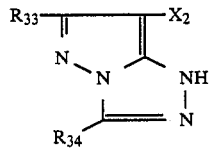

| Compound | $R_{33}$ | $R_{34}$ | $X_2$ |
|---|---|---|---|
| M-15 | 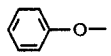 | 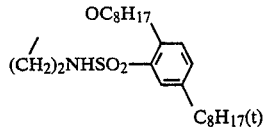 | Cl |
| M-16 | 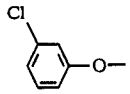 | 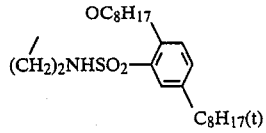 | 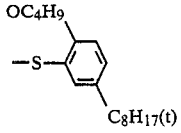 |

The phenol based cyan couplers and the naphthol based couplers are the most typical cyan couplers.

There are the phenol based cyan couplers (including polymer couplers) which have an alkyl group in the 5-position and an acylamino group in the 2-position of the phenol ring as disclosed in U.S. Pat. Nos. 2,369,929, 4,518,687, 4,511,647 and 3,772,002 etc., and typical examples include the coupler of illustrative example 2 described in Canadian Pat. No. 625,822, compound (1) described in U.S. Pat. No. 3,772,002, compounds (I-4) and (I-5) described in U.S. Pat. No. 4,564,590, compounds (1), (2), (3) and (24) described in JP-A-No. 61-39045 and compound (C-2) described in JP-A-No. 62-70846.

There are also the 2,5-diacylaminophenol based couplers disclosed as phenol based cyan couplers in U.S. Pat. Nos. 2,772,162, 2,895,826, 4,334,011 and 4,500,653 and in JP-A-No. 59-164555, and typical examples of these include compound (V) described in U.S. Pat. No. 2,895,826, compound (17) described in U.S. Pat. No. 4,557,999, compounds (2) and (12) described in U.S. Pat. No. 4,565,777, compound (4) described in U.S. Pat. No. 4,124,396, and compound (I-19) described in U.S. Pat. No. 4,613,564, etc.

Furthermore there are the phenol based cyan couplers in which a nitrogen containing heterocyclic ring is condensed with the phenol ring as disclosed in U.S. Pat. Nos. 4,327,173, 4,564,586 and 4,430,423, in JP-A-61-390441 and in JP-A-No. 62-257158, and typical examples of these cyan couplers included the couplers (1) and (3) described in U.S. Pat. No. 4,327,173, compounds (3) and (16) described in U.S. Pat. No. 4,564,586, compounds (1) and (3) described in U.S. Pat. No. 4,430,423, and the compounds set forth below.

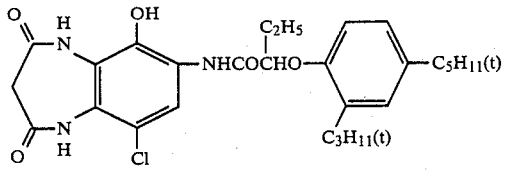

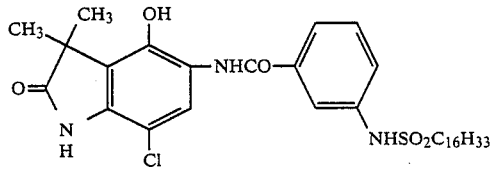

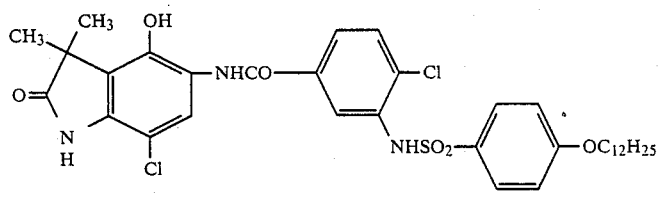

-continued

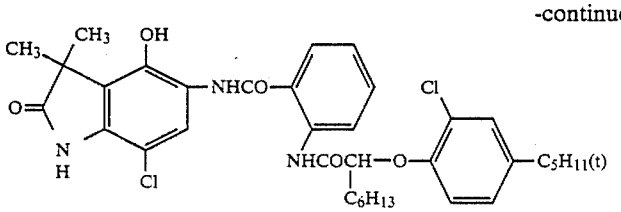

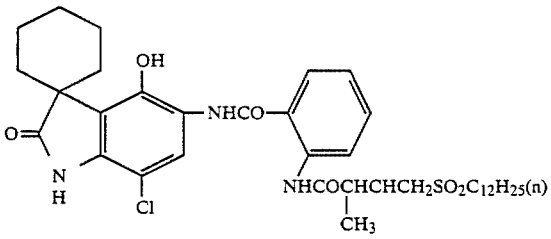

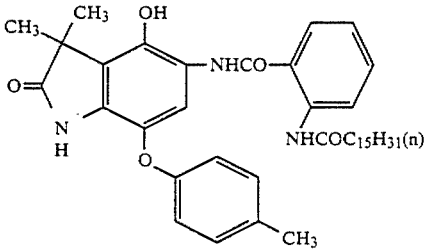

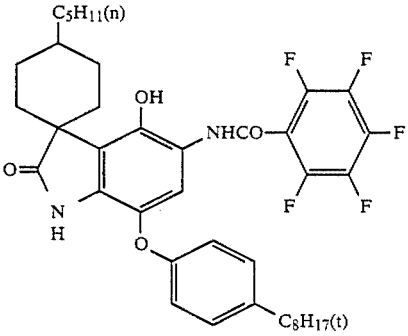

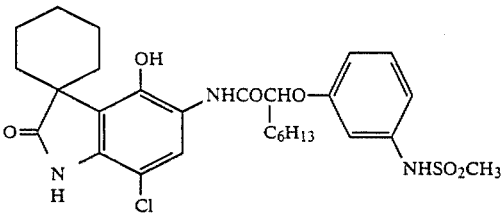

There are also ureido based couplers disclosed in U.S. Pat. Nos. 4,333,999, 4,451,559, 4,444,872, 4,427,767 and 4,579,813 and in European Patent (EP) No. 067,689B1 etc as phenol based cyan couplers, and typical examples of these include the coupler (7) described in U.S. Pat. No. 4,333,999, coupler (1) described in U.S. Pat. No. 4,451,559, coupler (14) described in U.S. Pat. No. 4,444,872, coupler (3) described in U.S. Pat. No. 4,427,767, couplers (6) and (24) described in U.S. Pat. No. 4,609,619, couplers (1) and (11) described in U.S. Pat. No. 4,579,813, couplers (45) and (50) described in European Patent (EP) No. 067,689B1, and coupler (3) described in JP-A-No. 61-42658, etc.

There are also naphthol based cyan couplers which have an N-alkyl-N-arylcarbamoyl group in the 2 position of the naphthol ring (for example U.S. Pat. No. 2,313,586), which have an alkylcarbamoyl group in the 2-position (for example U.S. Pat. Nos. 2,474,293 and 4,282,312), which have an arylcarbamoyl group in the 2-position (for example JP-B-No. 50-14523), and which have a carbonamido or sulfonamido group in the 5-position (for example JP-A-No. 60-237448, JP-A-No. 61-145557 and JP-A-No. 61-153640), and naphthol based couplers which have an aryloxy leaving group (for example U.S. Pat. No. 3,476,563), which have a substituted alkoxy leaving group (for example U.S. Pat. No. 4,296,199) and which have a glycolic acid leaving group (for example JP-B-No. 60-39217), etc.

The photosensitive material of this invention may contain hydroquinone derivatives, aminophenol derivatives, amines, gallic acid derivatives, catechol derivatives, ascorbic acid derivatives, colorless couplers, sulfonamidophenol derivatives etc. as anticolor fogging agents or anti-color mixing agents.

Various anti-color fading agents can also be used in the photosensitive materials of this invention. That is to say, typical examples of organic anti-color fading agents which can be used for cyan, magenta and yellow images include hydroquinones, 6-hydroxychromans, 5-hydroxycoumarans, spirochromans, p-alkoxyphenols, hindered phenols centered on the bisphenols, gallic acid derivatives, methylenedioxybenzenes, aminophenols, hindered amines and ether and ester derivatives in which the phenolic hydroxyl groups of these compounds have been silylated or alkylated. Furthermore, metal complexes typified by the (bissalicylaldoxymato)nickel complex and the (bis-N,N-dialkyldithiocarbamato)-nickel complex can be used for this purpose.

Actual examples of organic anti-color fading agents have been disclosed in the specifications of the following patents:

Hydroquinones have been disclosed in U.S. Pat. Nos. 2,360290, 2,418,613, 2,700,453, 2,701,197, 2,728,659, 2,732,300, 2,735,765, 3,982,944 and 4,430,425, in British Patent No. 1,363,921 and in U.S. Pat. Nos. 2,710,801 and 2,816,028 etc., 6-hydroxychromans, 5-hydroxycoumarans and spirochromans have been disclosed in U.S. Pat. Nos. 3,432,300, 3,573,050, 3,574,627, 3,698,909 and 3,764,337 and in JP-A-52-152225 etc., spiroindanes have been disclosed in U.S. Pat. No. 4,360,589, p-alkoxyphenols have been disclosed in U.S. Pat. No. 2,735,765, in British Patent No. 2,066,975, in JP-A-59-10539 and in JP-B-57-19764 etc., hindered phenols have been disclosed in U.S. Pat. No. 3,700,455, in JP-A-52-72225, in U.S. Pat. No. 4,228,235 and in JP-B-52-6623, etc., gallic acid derivatives, methylenedioxybenzenes and aminophenols have been disclosed in U.S. Pat. Nos. 3,457,079 and 4,332,886 and in JP-B-56-21144 respectively, hindered amines have been disclosed in U.S. Pat. Nos. 3,336,135 and 4,268,593, in British Patent Nos. 1,326,889, 1,354,313 and 1,410,846, in JP-B-51-1420, and in JP-A-58-114036, JP-A-59-53846 and JP-A-59-78344, etc., ether and ester derivatives of phenolic hydroxyl groups have been disclosed in U.S. Pat. Nos. 4,155,765, 4,174,220, 4,254,216 and 4,264,720, in JP-A-54-145530, JP-A-55-6321, JP-A-58-105147 and JP-A-59-10539, in JP-B-57-37856, in U.S. Pat. No. 4,279,990, and in JP-B-53-3263 etc., and metal complexes have been disclosed in U.S. Pat. Nos. 4,050,938 and 4,241,155 and in British Patent No. 2,027,731(A) etc. These compounds can be used to achieve the intended purpose by coemulsification with the couplers and addition to the photosensitive layer, normally at a rate of from 5 to 100 wt % with respect to the corresponding coupler. The introduction of ultraviolet absorbers into layers on either side adjacent to the cyan color forming layer is more effective for preventing deterioration of the cyan dye image by heat or, more especially, by light.

The use of the spiroindanes and hindered amines from among the above mentioned anti-color fading agents is especially desirable.

Ultraviolet absorbers can be included in the hydrophilic colloid layers of the photosensitive materials of this invention. For example, use can be made of the benzotriazole compounds substituted with aryl groups (for example those disclosed in U.S. Pat. No. 3,533,794), 4-thiazolidone compounds (for example those disclosed in U.S. Pat. Nos. 3,314,794 and 3,352,681), benzophenone compounds (for example those disclosed in JP-A-46-2784), cinnamic acid ester compounds (for example those disclosed in U.S. Pat. Nos. 3,705,805 and 3,707,375), butadiene compounds (for example those disclosed in U.S. Pat. No. 4,045,229), and benzooxidol compounds (for example those disclosed in U.S. Pat. No. 3,700,455). Ultraviolet absorbing couplers (for example the α-naphthol based cyan dye forming couplers) or ultraviolet absorbing polymers can also be used for this purpose. These ultraviolet absorbers may be mordanted into a specified layer.

Water soluble dyes can be included in the hydrophilic colloid layers of the photosensitive materials of this invention as filter dyes or for anti-irradiation and various other purposes Dyes of this type include oxonol dyes, hemi-oxonol dyes, styryl dyes, merocyanine dyes, cyanine dyes and azo dyes. Of these dyes, the oxonol dyes, hemi-oxonol dyes and merocyanine dyes are useful. Details of useful oxonol dyes have been described from line 16 of the upper left column on page 158 to page 163 of the specification of JP-A-62-215272.

The use of gelatin is convenient as the binding agent or protective colloid in the emulsion layers of the photosensitive materials of this invention, but other hydrophilic colloids can be used either independently or in conjunction with gelatin.

The gelatin used in the invention may be a lime treated gelatin, or an acid treated gelatin can be used. Details of the manufacture of gelatin have been described by Arthur Wiese in "The Macromolecular Chemistry of Gelatin" (published by Academic Press, 1964).

The cellulose nitrate films, cellulose acetate films, cellulose acetate butyrate films, cellulose acetate propionate films, polystyrene films, polyethyleneterephthalate films, polycarbonate films, laminates of these films, thin glass films, paper etc. normally used in photographic materials can be used as the support which is used in this invention. Supports such as papers which have been coated or laminated with baryta or an α-olefin polymer, especially a polymer made from an α-olefin which has from 2 to 10 carbon atoms, for example polyethylene, polypropylene, ethylene/butene copolymer etc., vinyl chloride resins which contain reflecting substances such as $TiO_2$, and plastic films of which the adhesion with other polymeric materials has been improved by surface roughening as described in JP-B-47-19068 provide good results. Furthermore, ultraviolet curable resins can be used for this purpose.

A transparent support or a non-transparent support can be selected according to the intended purpose of the photosensitive material. Furthermore, the supports can be rendered colored and transparent by the addition of dyes or pigments.

Apart from the original non-transparent supports such as paper, non-transparent supports also include those made by adding dyes or organic pigments such as titanium oxide to a transparent film and plastic films which have been surface treated using methods such as those described in JP-B-47-19068, etc. An undercoating layer is normally established on the support. Preliminary surface treatments such as corona discharge treatments, ultraviolet irradiation and flame treatments etc. can also be used with these supports in order to improve adhesion properties.

The color photosensitive materials which can be used for making color photographs of this invention may be any of the usual types of color photographic materials, for example color negative films, color papers, color reversal papers, color reversal films, color positive films etc.

Black and white development baths and/or color development baths can be used for the development processing of the photosensitive materials of this invention. A color development bath preferably consists of an aqueous alkaline solution which contains a primary aromatic amine based color developing agent as the principal component. Aminophenol based compounds are also useful as color developing agents, but the use of p-phenylenediamine based compounds is preferred. Typical examples of these compounds include 3-methyl-4-amino-N,,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-N-β-methoxyethylaniline and the sulfate, hydrochloride and p-toluenesulfonate salts of these compounds. Two or more of these compounds can be used conjointly, depending on the intended purpose.

The color development baths generally contain pH buffers such as alkali metal carbonates, borates or phosphates, and development inhibitors or anti-fogging agents such as bromides, iodides, benzimidazoles, benzothiazoles or mercapto compounds etc. They may also contain, as required, various preservatives such as hydroxylamine, diethylhydroxylamine, sulfites, hydrazines, phenylsemicarbazides, triethanolamine, catechol sulfonic acids, triethylenediamine(1,4diazabicyclo[2,2,-2]octane) etc., organic solvents such as ethylene glycol and diethylene glycol, development accelerators such as benzyl alcohol, poly(ethylene glycol), quaternary ammonium salts and amines, color forming couplers, competitive couplers, fogging agents such as sodium borohydride, auxiliary developing agents such as 1-phenyl-3-pyrazolidone, viscosity imparting agents, and various chelating agents as typified by the aminopolycarboxylic acids, aminopolyphosphonic acids, alkylphosphonic acids and phosphonocarboxylic acids, typical examples of which include ethylenediamine tetra-acetic acid, nitrilo triacetic acid, diethylenetriamine penta-acetic acid, cyclohexanediamine tetra-acetic acid, hydroxyethylimino diacetic acid, 1-hydroxyethylidene1,1-diphosphonic acid, nitrilo-N,N,N-trimethylenephosphonic acid, ethylenediamine-N,N,N',N'-tetramethylenephosphonic acid, ethylenediamine di(o-hydroxyphenylacetic acid), and salts of these compounds.

Color development is carried out after a normal black and white development in the case of reversal processing. The known black and white developing agents, for example dihydroxybenzenes such as hydroquinone etc., 3-pyrazolidones such as 1-phenyl-3-pyrazolidone etc., and aminophenols such as N-methyl-p-aminophenol etc., can be used individually or in combinations for the black and white development bath.

The pH of these color developers and black and white developers is generally within the range of from 9 to 12. Furthermore, the replenishment rate of the development bath depends on the color photographic material which is being processed, but it is generally less than 3 liters per square meter of photosensitive material and it is possible, by reducing the bromide ion concentration in the replenisher, to use a replenishment rate of less than 500 ml per square meter of photosensitive material. Prevention of the loss of liquid by evaporation, and aerial oxidation, by minimizing the contact area with the air in the processing tank is desirable in cases where the replenishment rate is low. Furthermore, the replenishment rate can be reduced by using a means of suppressing the accumulation of bromide ion in the developer.

The photographic emulsion layers are subjected to a normal bleaching process after color development. The bleaching process may be carried out at the same time as the fixing process (in a bleach-fix process) or it may be carried out as a separate process. Moreover, a bleach-fix process can be carried out after a bleaching process in order to speed-up processing. Moreover processing can be carried out in two connected bleach-fix baths, a fixing process can be carried out before carrying out a bleach-fix process or a bleaching process can be carried out after a bleach-fixing process, according to the intended purpose of the processing. Compounds of a multi-valent metal such as iron(III), cobalt(III), chromium(VI), copper(II) etc., peracids, quinones, nitro compounds etc. can be used as bleaching agents. Typical bleaching agents include ferricyanides; dichromates; organic complex salts of iron(III) or cobalt(III), for example complex salts with aminopolycarboxylic acids such as ethylenediamine tetraacetic acid, diethylenetriamine penta-acetic acid, cyclohexanediamine tetra-acetic acid, methylimino diacetic acid, 1,3-diaminopropane tetra-acetic acid, glycol ether diamine tetra-acetic acid etc. or citric acid, tartaric acid, malic acid etc.; persulfates; bromates; permanganates and nitrobenzenes etc. Of these materials the use of the aminopolycarboxylic acid iron(III) complex salts, principally ethylenediamine tetra-acetic acid iron(III) complex salts, and persulfates is preferred from the points of view of both rapid processing and the prevention of environmental pollution. Moreover, the amino polycarboxylic acid iron(III) complex salts are especially useful in both bleach baths and bleach-fix baths. The pH of a bleach or bleach-fix bath in which aminopolycarboxylic acid iron(III) complex salts are being used in normally from 5.5 to 8, but processing can be carried out at lower pH values in order to speed-up processing.

Bleach accelerators can be used, as required, in the bleach baths, bleach-fix baths, or bleach or bleach-fix pre-baths. Actual examples of useful bleach accelerators have been disclosed in the following specifications: Thus there are the compounds which have a mercapto group or a disulfide group disclosed in U.S. Pat. No. 3,893,858, West German Patent Nos. 1,290,812 and 2,059,988, in JP-A-53-32736, JP-A-53-57831, JP-A-5-37418, JP-A-53-72623, JP-A-53-95630, JP-A-53-95631, JP-A-53-104432, JP-A-53-124424, JP-A-53-141623, JP-A-53-28426, and in *Research Disclosure* No. 17129 (July 1978) etc.; the thiazolidine derivatives disclosed in JP-A-50-140129; the thiourea derivatives disclosed in JP-B-45-8506, JP-A-52-20832 and JP-A-53-32735, and in U.S. Pat. No. 3,706,561; the iodides disclosed in West German Patent No. 1,127,715 and in JP-A-58-16235; the polyoxyethylene compounds disclosed in West German Patent Nos. 966,410 and 2,748,430; the polyamine compounds disclosed in JP-B-45-8836; the other compounds disclosed in JP-A-49-42434, JP-A-49-59644, JP-A-53-94927, JP-A-54-35727, JP-A-55-26506 and JP-A-58-163940; and bromide ions etc. Among these compounds, those which have a mercapto group or a disulfide group are preferred in view of their large accelerating effect, and the use of the compounds disclosed in U.S. Pat. No. 3,893,858, in West German Patent No. 1,290,812 and in JP-A-53-95630 is especially desirable. Moreover, the use of the compounds disclosed in U.S.

Pat. No. 4,552,834 is also desirable. These bleach accelerators may be added to the sensitive material. These bleach accelerators are especially effective when bleach-fixing color photosensitive materials for camera purposes.

Thiosulfates, thiocyanates, thioether based compounds, thioureas and large quantities of iodides etc. can be used as fixing agents, but thiosulfates are generally used for this purpose, and ammonium thiosulfate in particular can be used in the widest range of applications. Sulfites or bisulfites, or carbonylbisulfite addition compounds, are the preferred preservatives for bleach-fix baths.

The silver halide color photographic materials of this invention are generally subjected to a water washing and/or stabilizing process after the desilvering process. The amount of water used in the water washing process can be fixed within a wide range according to the nature of the photosensitive material (for example the materials, such as the couplers, which are being used), the use, the wash water temperature, the number of washing tanks (the number of washing stages), the replenishment system, i.e., whether a counter-flow or a sequential-flow system is used, and various other conditions. The relationship between the amount of water used and the number of water washing tanks in a multi-stage counter-flow system can be obtained using the method outlined on pages 248 to 253 of *Journal of the Society of Motion Picture and Television Engineers,* Volume 64 (May 1955).

The amount of wash water can be greatly reduced by using the multi-stage counter-flow system noted in the aforementioned literature, but bacteria proliferate due to the increased residence time of the water in the tanks and problems arise as a result of the sediments which are formed becoming attached to the photosensitive material. The method in which the calcium ion and manganese ion concentrations are reduced as disclosed in JP-A-62-288838 can be used very effectively to overcome problems of this sort in the processing of color photosensitive materials of this invention. Furthermore, the isothiazolone compounds and thiabendazoles disclosed in JP-A-57-8542 and the chlorine based disinfectants such as chlorinated sodium isocyanurate, and benzotriazoles etc., and the disinfectants disclosed in "Chemistry of Biocides and Fungicides" by Horiguchi, "Reduction of Microorganisms, Biocidal and Fungicidal Techniques", published by the Health and Hygiene Technical Society and in "A Dictionary of Biocides and Fungicides", published by the Japanese Biocide and Fungicide Society, can be used for this purpose.

The pH value of the wash water used in the processing of the photosensitive materials of the invention is within the range from 4 to 9, and preferably within the range from 5 to 8. The wash water temperature and the washing time can be set variously according to the nature of the photosensitive material and the application etc. but, in general, washing conditions of from 20 seconds to 10 minutes at a temperature of from 15 to 45° C., and preferably of from 30 seconds to 5 minutes at a temperature of from 25 to 40° C., are selected. Moreover, the photosensitive materials of this invention can be processed directly in a stabilizing bath instead of being subjected to a water wash as described above. The known methods disclosed in JP-A-57-8543, JP-A-58-14834 and JP-A-60-220345 can all be used for this purpose.

Furthermore, there are cases in which a stabilization process is carried out following the aforementioned water washing process and the stabilizing baths which contain formalin and surfactant which are used as a final bath for camera color photosensitive materials are an example of such a process. Various chelating agents and fungicides etc. can be added to these stabilizing baths.

The overflow which accompanies replenishment of the above mentioned wash water and/or stabilizer can be re-used in other processes such as the desilvering process etc.

A color developing agent may also be incorporated into the silver halide color photosensitive material of this invention in order to simplify and speed-up processing. The incorporation of various color developing agent precursors is preferred. For example, the indoaniline based compounds disclosed in U.S. Pat. No. 3,342,597, the Schiff's base type compounds disclosed in U.S. Pat. No. 3,342,599 and in *Research Disclosure* Nos. 14850 and 15159, the aldol compounds disclosed in *Research Disclosure* No. 13924, the metal salt complexes disclosed in U.S. Pat. No. 3,719,492, and the urethane based compounds disclosed in JP-A-53-135628 can be used for this purpose.

Various 1-phenyl-3-pyrazolidones can be incorporated, as required, into the silver halide color photosensitive materials of this invention with a view to accelerating color development. Typical compounds of this type have been disclosed in JP-A-56-64339, JP-A-57-144547 and JP-A-58-115438 etc.

The various processing baths are used at a temperature of from 10° to 50° C. in this invention. The standard temperature is normally from 33° to 38° C., but processing is accelerated and the processing time is shortened at higher temperatures and, conversely, increased picture quality and improved stability of the processing baths can be achieved at lower temperatures. Furthermore, processes using hydrogen peroxide intensification or cobalt intensification as disclosed in West German Patent No. 2,226,770 or U.S. Pat. No. 3,674,499 can be carried out in order to economize on silver in the photosensitive material.

The present invention will now be described by reference to specific non-limiting examples. Unless otherwise indicated all percents, ratios, parts, etc. are by weight.

EXAMPLE 1

Lime treated gelatin (30 grams) was added to 1000 cc of distilled water and, after dissolving at 40° C., 6.5 grams of sodium chloride was added and the temperature was raised to 75° C. A solution obtained by dissolving 62.5 grams of silver nitrate in 750 cc of distilled water and a solution obtained by dissolving 30.6 grams of potassium bromide and 6.5 grams of sodium chloride in 500 cc of distilled water were added to, and mixed with, the aforementioned solution over a period of 40 minutes while maintaining the temperature at 75° C. Next, a solution obtained by dissolving 62.5 grams of silver nitrate in 500 cc of distilled water and a solution obtained by dissolving 30.6 grams of potassium bromide and 6.5 grams of sodium chloride in 300 cc of distilled water were added to and mixed with the resulting mixture over a period of 20 minutes while maintaining the temperature at 75° C.

A solution obtained by dissolving 4.4 grams of potassium bromide in 50 cc of distilled water was added 10 minutes after the completion of the addition described above and, after stirring for a further period of 10 minutes, the mixture was desalted and washed, 6 mg of sodium thiosulfate was added and the emulsion was ripened for 40 minutes at 60° C. This emulsion (cubic grains of average grain size 0.53 μ, variation coefficient 0.12) was coated, after the addition of the aforementioned sensitizing dye D-29 ($3\times10^{-4}$ mol/mol of silver), onto a cellulose triacetate base in such a way that the coated weight of silver was 2.3 g/m2 and the coated weight of gelatin was 3.3 g/m2 to provide sample $A_1$.

An emulsion prepared in the same way except that the sensitizing dye D-29 was added at the rate of $3\times10^{-4}$ mol per mol of silver 3 minutes after the completion of the addition of the silver nitrate and silver halide on the second occasion when preparing the emulsion used in the production of sample $A_1$ was coated onto a cellulose triacetate base in the same quantities as for sample $A_1$ to provide sample $B_1$.

Emulsions prepared in the same way as before except that the amount of potassium bromide added 10 minutes after the addition of the silver salt and halogen salts on the second occasion when preparing the emulsion of sample $B_1$ was changed from 4.4 grams to 0.2 gram, 0.6 gram, 10.6 grams and 21.9 grams were coated in the same way as sample $B_1$ to provide samples $C_1$, $D_1$, $E_1$ and $F_1$.

Emulsions were then prepared by adding emulsions (gelatin content 50 g/kg, silver bromide content 122 g/kg, average grain size 0.06 μ, variation coefficient 0.07) which contained an equimolar amount of silver bromide in place of the potassium bromide solution which was added after 10 minutes in the preparation of the emulsions used in samples $A_1$ to $F_1$, and these emulsions were used to prepare the corresponding samples $A_2$ to $F_2$ in the same way as before.

The samples $A_1$ to $F_1$, and $A_2$ to $F_2$ were exposed for 0.5 second to white light of color temperature 5400° K through an optical wedge and then the samples were developed for 10 minutes at 20° C. using the development bath indicated below. The photographic density was measured in each case and the results obtained are shown in Table 1.

| Development Bath | |
|---|---|
| Ascorbic acid | 10 g |
| p-N-Methylaminophenol | 2.4 g |
| Sodium carbonate | 10 g |
| Potassium bromide | 1 g |
| Water | to make up to 1 l |

TABLE 1

| Sample | Potassium bromide (g) (mol %) | Cyanine dye (during exchange) (mol/mol Ag) | Speed | Fogging | Pressure Desensitization | Pressure Fogging | Remarks |
|---|---|---|---|---|---|---|---|
| $A_1$ | 4.4 (5) | — | 100 | 0.02 | 91 | 0.42 | Comparative Ex. |
| $B_1$ | 4.4 (5) | D-29 ($3\times10^{-4}$) | 121 | 0.02 | 97 | 0.09 | Comparative Ex. |
| $C_1$ | 0.2 (0.2) | " | 80 | 0.02 | 100 | 0.56 | Comparative Ex. |
| $D_1$ | 0.6 (0.7) | " | 103 | 0.02 | 97 | 0.18 | Comparative Ex. |
| $E_1$ | 10.6 (12) | " | 126 | 0.02 | 87 | 0.07 | Comparative Ex. |
| $F_1$ | 21.9 (25) | " | 126 | 0.02 | 77 | 0.03 | Comparative Ex. |
| **Sample** | **Silver Bromide (g) (mols %)** | **Cyanine dye (during recrystallization) (mol/mol Ag)** | **Speed** | **Fogging** | **Pressure Desensitization** | **Pressure Fogging** | **Remarks** |
| $A_2$ | 6.9 (5) | — | 97 | 0.02 | 94 | 0.33 | Comparative Ex. |
| $B_2$ | 6.9 (5) | D-29 ($3\times10^{-4}$) | 123 | 0.02 | 100 | 0.04 | This Invention |
| $C_2$ | 0.3 (0.2) | " | 77 | 0.02 | 100 | 0.41 | Comparative Ex. |
| $D_2$ | 0.95 (0.7) | " | 107 | 0.02 | 100 | 0.13 | This Invention |
| $E_2$ | 16.7 (12) | " | 129 | 0.02 | 92 | 0.05 | This Invention |
| $F_2$ | 34.6 (25) | " | 126 | 0.02 | 88 | 0.03 | Comparative Ex. |

The speed is shown as a relative value of the reciprocal of the exposure required to provide a density of fog +0.5, the value obtained for sample $A_1$ being taken to be 100. Pressure desensitization is indicated for each sample as the change in density in the folded region when the coated sample had been folded through 90° C. prior to exposure and development, the relative value of density 0.3 being taken to be 100. Pressure fogging is indicated by the density of a part of the coated sample which had been folded through 45° C.

On comparing the results obtained with samples $A_1$ to $F_1$ where halogen exchange had been carried out with the addition of potassium bromide with the results obtained with samples $A_2$ to $F_2$ where recrystallization had been carried out using an equimolar amount of silver bromide it is clear that the samples obtained with the addition of silver bromide were all better with respect to pressure desensitization and pressure fogging.

Moreover, of the samples $A_2$ to $F_2$, the sample $A_2$ in which an emulsion which had been recrystallized in the absence of cyan dye was used was liable to both pressure desensitization and pressure fogging, while with sample $B_2$ of this invention there was a clear improvement in performance with an increase in speed and, moreover, a reduction of both pressure desensitization and pressure fogging.

Even when the cyanine dye was present, the speed was reduced when the extent of recrystallization was small, and although pressure desensitization did not occur, pressure fogging occurred easily. Furthermore, the speed was high when a large amount of recrystallization had been carried out and there was no pressure fogging, but very considerable pressure desensitization occurred under these conditions. It is clear that the samples of this invention were such that both pressure desensitization and pressure fogging were suppressed to levels where they did not become a problem in practical terms.

EXAMPLE 2

Lime treated gelatin (30 grams) was added to 1000 cc of distilled water and, after dissolving at 40° C., 6.5 grams of sodium chloride was added and the temperature was raised to 70° C. A solution obtained by dissolving 62.5 grams of silver nitrate in 750 cc of distilled water and a solution obtained by dissolving 21.9 grams of potassium bromide and 10.8 grams of sodium chloride in 500 cc of distilled water were added to, and mixed with, the aforementioned solution over a period of 40 minutes while maintaining the temperature at 70° C. Next, a solution obtained by dissolving 62.5 grams of silver nitrate in 500 cc of distilled water and a solution obtained by dissolving 21.9 grams of potassium bromide and 10.8 grams of sodium chloride in 300 cc of distilled water were added to, and mixed with, the resulting mixture over a period of 20 minutes while maintaining the temperature at 75° C.

A solution obtained by dissolving 3.5 grams of potassium bromide in 50 cc of distilled water was added 5 minutes after the completion of the addition described above and, after stirring for a further period of 5 minutes, the mixture was desalted and washed, 4.8 mg of sodium thiosulfate was added and the emulsion was ripened for 40 minutes at 60° C. After adding the aforementioned sensitizing dye D-30 ($3\times10^{-4}$ mol/mol of silver) to this emulsion (variation coefficient 0.12) it was coated onto a cellulose triacetate base in such a way that the coated weight of silver was 2.3 g/m$_2$ and the coated weight of gelatin was 3.3 g/m$_2$ to provide sample $G_1$.

Moreover, D-30 was added before coating at the rates of $2.25\times10^{-4}$, $1.5\times10^{-4}$, or 0 mol per mol of silver to emulsions prepared in the same way as before except that sensitizing dye D-30 had been added at the rate of $0.75\times10^{-4}$, $1.5\times10^{-4}$, or $3\times10^{-4}$, mol per mol of silver before 5 minutes of the completion of the addition of the silver nitrate and silver halide on the second occasion when preparing the emulsion used in the production of the sample $G_1$, and these emulsions were coated onto a cellulose triacetate base in the same quantities as for sample $G_1$ to provide samples $H_1$, $I_1$ and $J_1$. Emulsions were then prepared by adding an emulsion (gelatin content 50 g/kg, silver bromide content 122 g/kg, average grain size 0.06 μ, variation coefficient 0.07, irridium content $2.4\times10^{-5}$ mol per mol of silver) which contained an equimolar amount of silver bromide and irridium bromide mixed crystals in place of the potassium bromide which has added after 5 minutes in the preparation of the emulsions used in samples $G_1$ to $J_1$, and these emulsions were used to prepare the corresponding samples $G_2$ to $J_2$ in the same way as before. These samples were exposed and processed in the same way as in Example 1 and the results obtained were as shown in Table 2. The speeds are indicated as relative values with respect to that of sample $G_1$ which was taken to be 100.

bromide were used were better in respect of pressure desensitization and pressure fogging than those in which the emulsions where halogen exchange had been carried out using potassium bromide, and this effect was especially pronounced in cases where the recrystallization had been carried out in the presence of cyanine dye. Furthermore, it has been confirmed that the reciprocity law characteristics were improved by the inclusion of the irridium salt in the samples of this invention and that the latent image storage properties were also improved.

EXAMPLE 3

Lime treated gelatin (30 grams) was added to 1000 cc of distilled water and, after dissolving at 40° C., 6.5 grams of sodium chloride was added and the temperature was raised to 75° C. A solution obtained by dissolving 62.5 grams of silver nitrate in 750 cc of distilled water and a solution obtained by dissolving 35.0 grams of potassium bromide and 4.3 grams of sodium chloride in 500 cc of distilled water were added to, and mixed with, the aforementioned solution over a period of 40 minutes while maintaining the temperature at 80° C. Next, a solution obtained by dissolving 62.5 grams of silver nitrate in 500 cc of distilled water and a solution obtained by dissolving 26.3 grams of potassium bromide and 8.6 grams of sodium chloride in 300 cc of distilled water were added to, and mixed with, the resulting mixture over a period of 20 minutes while maintaining the temperature at 70° C.

Similar samples to $A_1$ to $F_1$ and $A_2$ to $F_2$ were prepared using this emulsion by carrying out halogen exchange with potassium bromide or recrystallization with silver bromide in the presence of the sensitizing dye D-29 in the same way as in Example 1. These examples were tested in the same way as in Example 1 and the results obtained indicated that the samples of this invention had good pressure characteristics.

EXAMPLE 4

Samples $K_1$ and $K_2$ were prepared by coating without the addition of sensitizing dye to the emulsions used when preparing samples $A_1$ and $A_2$ in Example 1. Similarly samples $L_1$ to $T_1$, $L_2$ to $T_2$ to which no sensitizing dye had been added were prepared in the same way except that the sensitizing dye added during the preparation of emulsions $B_1$ and $B_2$ was changed from D-29 to the sensitizing dye indicated in Table 3, and the results obtained on exposing and processing these samples in the same way as in Example 1 are as shown in Table 3. However, in this example direct comparison of speed was of no significance since the type of sensitizing dye

TABLE 2

| Sample | Potassium bromide (g) (mol %) | Cyanine dye (during exchange) (mol/mol Ag) | Speed | Fogging | Pressure Desensitization | Pressure Fogging | Remarks |
|---|---|---|---|---|---|---|---|
| $G_1$ | 3.5 (4) | — | 100 | 0.02 | 83 | 0.63 | Comparative Ex. |
| $H_1$ | " | D-30 ($0.75\times10^{-4}$) | 115 | 0.02 | 93 | 0.26 | Comparative Ex. |
| $I_1$ | " | D-30 ($1.5\times10^{-4}$) | 121 | 0.02 | 95 | 0.14 | Comparative Ex. |
| $J_1$ | " | D-30 ($3\times10^{-4}$) | 123 | 0.02 | 97 | 0.08 | Comparative Ex. |
| **Sample** | **Silver bromide (g) (mol %)** | **Cyanine dye (during recrystallization) (mol/mol Ag)** | **Speed** | **Fogging** | **Pressure Desensitization** | **Pressure Fogging** | **Remarks** |
| $G_2$ | 5.5 (4) | — | 97 | 0.02 | 89 | 0.48 | Comparative Ex. |
| $H_2$ | 5.5 (4) | D-30 ($0.75\times10^{-4}$) | 115 | 0.02 | 95 | 0.19 | This Invention |
| $I_2$ | " | D-30 ($1.5\times10^{-4}$) | 118 | 0.02 | 100 | 0.10 | This Invention |
| $J_2$ | " | D-30 ($3\times10^{-4}$) | 121 | 0.02 | 100 | 0.06 | This Invention |

It is clear from these results that the samples in which emulsions which had been recrystallized with silver differed, and so only the pressure desensitization and pressure fogging characteristics have been compared.

The pressure desensitization of each sample is indicated as the relative speed when the speed of the sample when no pressure had been applied was taken to be 100.

TABLE 3

| Sample | Cyanine dye (Amount added) (mol/mol Ag) | Pressure desensitization | Pressure Fogging | Remarks |
|---|---|---|---|---|
| $K_1$ | — | 82 | 0.36 | Comparative Ex. |
| $K_2$ | — | 87 | 0.13 | " |
| $L_1$ | D-22 ($1 \times 10^{-4}$) | 92 | 0.18 | " |
| $L_2$ | " | 95 | 0.15 | This Invention |
| $M_1$ | D-22 ($3 \times 10^{-4}$) | 96 | 0.13 | Comparative Ex. |
| $M_2$ | " | 98 | 0.11 | This Invention |
| $N_1$ | D-22 ($6 \times 10^{-4}$) | 92 | 0.11 | Comparative Ex. |
| $N_2$ | " | 93 | 0.08 | This Invention |
| $O_1$ | D-24 ($3 \times 10^{-4}$) | 97 | 0.15 | Comparative Ex. |
| $O_2$ | " | 97 | 0.12 | This Invention |
| $P_1$ | D-30 ($3 \times -4$) | 96 | 0.08 | Comparative Ex. |
| $P_2$ | " | 97 | 0.06 | This Invention |
| $Q_1$ | D-36 ($3 \times 10^{-4}$) | 94 | 0.09 | Comparative Ex. |
| $Q_2$ | " | 96 | 0.06 | This Invention |
| $R_1$ | D-97 ($8 \times 10^{5}$) | 88 | 0.22 | Comparative Ex. |
| $R_2$ | " | 92 | 0.18 | This Invention |
| $S_1$ | D-101 ($8 \times 10^{-5}$) | 86 | 0.23 | Comparative Ex. |
| $S_2$ | " | 88 | 0.18 | This Invention |
| $T_1$ | D-102 ($8 \times 10^{-5}$) | 89 | 0.21 | Comparative Ex. |
| $T_2$ | " | 91 | 0.16 | This Invention |

The samples prepared using emulsions which had been recrystallized using silver bromide in the presence of a sensitizing dye gave better results in which both pressure desensitization and pressure fogging were reduced.

EXAMPLE 5

Samples were prepared in the same way as samples L2 to T2 but changing the silver bromide emulsion used for recrystallization of each of the emulsions prepared in Example 4 in the preparation of samples $L_2$ to $T_2$ to a silver chlorobromide emulsion (gelatin 50 g/kg, silver bromide content 70 mol %, silver chloride content 30 mol %, total silver halide content 113 g/kg, average grain size 0.065 $\mu$, variation coefficient 0.07) and the results obtained indicated that the samples corresponding to samples $M_2$ to $T_2$ had similarly excellent pressure characteristics.

EXAMPLE 6

Four types of emulsions were prepared using silver bromide/irridium hexachloride mixed crystals (average grain size 0.06 $\mu$, variation coefficient 0.07, irridium content $2.4 \times 10^{-5}$ mol per mol of silver) or silver bromide/rhodium bromide mixed crystals (average grain size 0.06 $\mu$, variation coefficient 0.07, rhodium content $2 \times 10^{-6}$ mol per mol of silver) respectively in place of the silver bromide/irridium bromide mixed crystals used in the preparation of the emulsions used in Example 2. In the former case results virtually the same as those obtained using the emulsions of Example 2 were obtained, but the performance of the emulsions corresponding to emulsions $H_2$, $I_2$ and $J_2$ were superior in respect of pressure characteristics and reciprocity law characteristics. In the latter case the results were different from those obtained with the emulsions in Example 2 but the emulsions of this invention were particularly good in respect of their pressure characteristics and the hardness of the gradation.

EXAMPLE 7

Multi-layer color printing papers of which the layer structure was shown in table 9 were prepared on a paper support which had been laminated on both sides with polyethylene.

First Layer Coating Liquid

Ethyl acetate (27.2 cc) and 7.9 cc of solvent (c) were added to 22.0 grams of yellow coupler (a) and 3.9 grams of the colored image stabilizer (b) to form a solution and this solution was emulsified and dispersed in 185 cc of 10% aqueous gelatin solution which contained 8 cc of 10% sodium dodecylbenzenesulfonate. On the other hand, the blue sensitive sensitizing dye indicated below was added at the rate of $5.0 \times 10^{-4}$ mol per mol of silver to a silver chlorobromide emulsion (silver bromide content 80 mol %, average grain size 0.81 $\mu$, variation coefficient 0.10, cubic form) to provide an emulsion. The above mentioned emulsified dispersion and the emulsion were mixed together to form a solution and the first layer coating liquid of which the composition is shown in Table 4 was prepared. The coating liquids for the second to the seventh layers were prepared in the same way as the coating liquid for the first layer, and the composition of the second to seventh layers are shown in Table 4. Moreover, 1-oxy-3,5-dichloro-s-triazine, sodium salt, was added to each layer as a gelatin hardening agent.

The emulsions $A_1$ to $F_1$ and $A_2$ to $F_2$ prepared in Example 1 and the emulsions $G_1$ to $J_1$ and $G_2$ to $J_2$ prepared in Example 2 were used for the emulsion used for the green sensitive layer. Dye was added in the same way as in each example, the addition being made at the time of coating in the case of the emulsions $A_1$, $A_2$, $G_1$ to $I_{11}$, $G_2$ to $I_2$. These samples are referred to sequentially as samples $u_1$ to $u_{12}$ and $v_1$ to $v_8$.

The spectrally sensitizing dyes indicated below were used for each layer other than the green sensitive emulsion layer.

| |
|---|
| Blue Sensitive Emulsion Layer |
| D-24 |
| ($5.0 \times 10^{-4}$ mol per mol of silver halide) |
| Red Sensitive Emulsion Layer |
| D-97 |
| ($0.8 \times 10^{-4}$ mol per mol of silver halide) |

Moreover, 4-hydroxy-6-methyl-1,3,3a,7-tetra-azaindene was added as stabilizer and 1-(m-methyl-ureido)-phenyl-5-mercaptotetrazole was added as an antifogging agent to each of the emulsion layers. Furthermore, 2-amino-5-mercapto-1,3,4-thiadiazole and 4,4'-bis(-dinaphthoxypyrimidinylamino)stilbene-2,2'-sulfonic acid, (0.006 mg/m$^2$) were added to the red sensitive layer.

The dyes indicated below were added to the emulsion layers for anti-irradiation purposes.

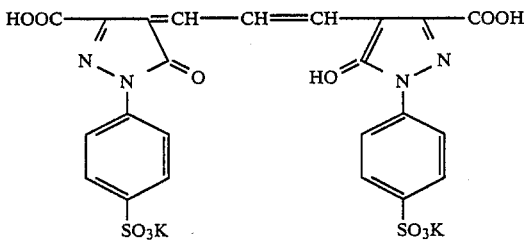
(Coated weight 0.012 g/m$^2$)
and
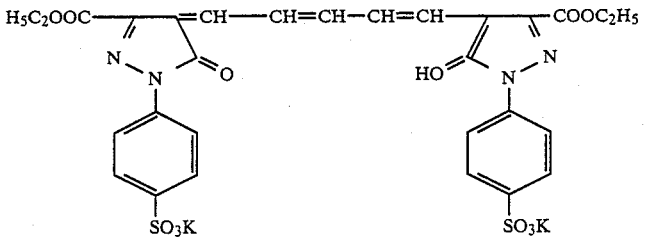
(Coated weight 0.008 g/m$^2$)
The structural formulae of the compounds such as the couplers etc. used in this example are indicated below.
(a) Yellow Coupler
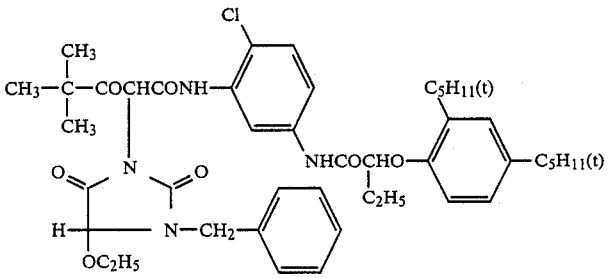
(b) Colored Image Stabilizer
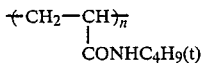
Molecular weight 70,000
(c) Solvent
A 1:1 mixture (by weight) of:
$(iso\text{-}C_9H_{19}O)_3{-}P{=}O$
and
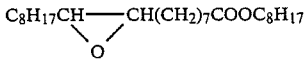
(d) Anti-color Mixing Agent
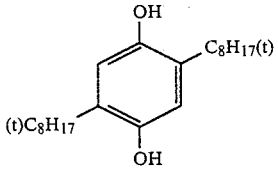
(e) Magenta Coupler -continued
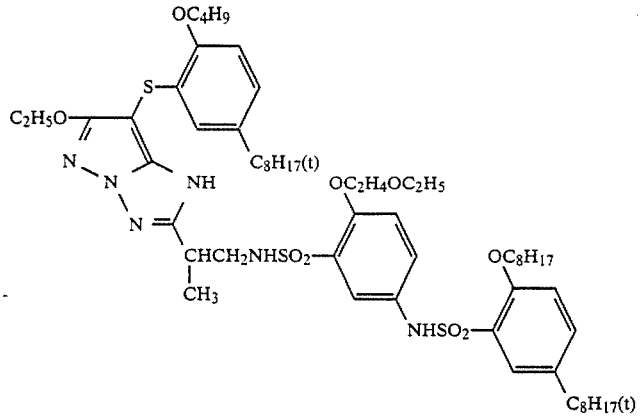
(f) Colored Image Stabilizer
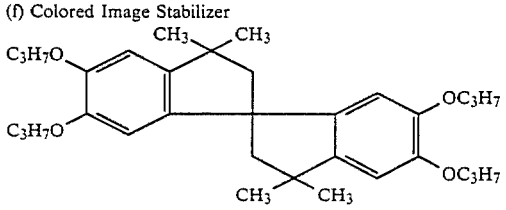
(g) Solvent
A 2:1 mixture (by weight) of
$(C_8H_{17}O)_3P{=}O$
and
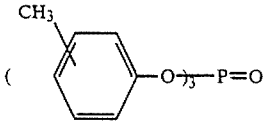
(h) Ultraviolet Absorber
A 2:4:4 mixture (by weight) of
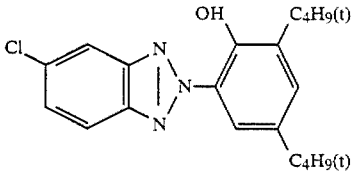
and
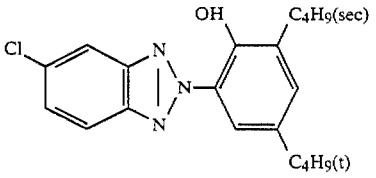
and
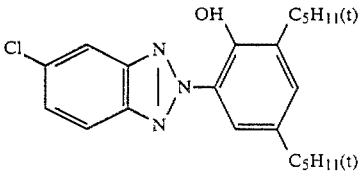
(j) Solvent
A 1:3 mixture (by weight) of -continued
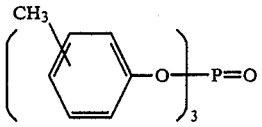
and
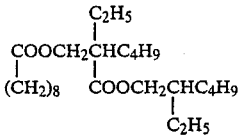
(k) Cyan Coupler
A 1:1 (mole ratio) mixture of
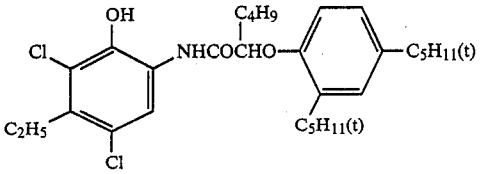
and
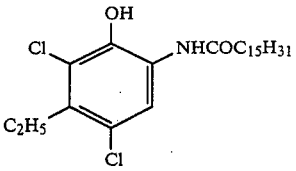
(l) Colored Image Stabilizer
A 1:3:3 (mole ratio) mixture of
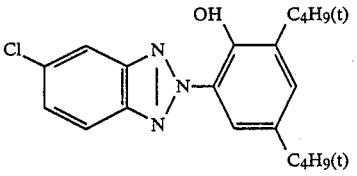
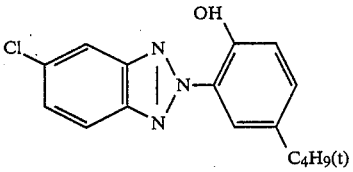
and
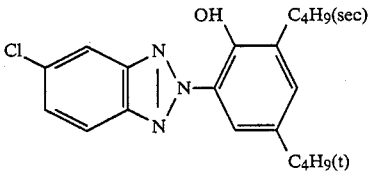
(m) Colored Image Stabilizer
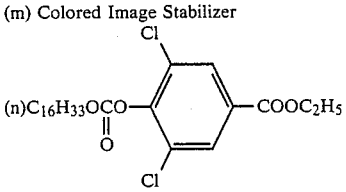
(n) Color Image Stabilizer -continued

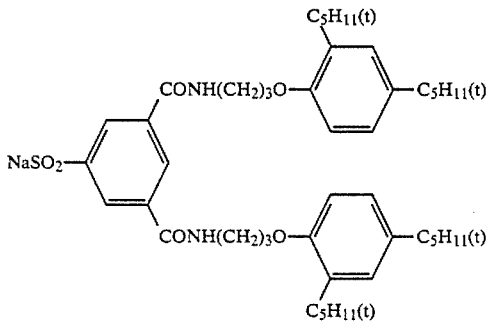

TABLE 4

| Layer | Principal Composition | Amount Used ($g/m^2$) |
|---|---|---|
| Seventh layer (Protective layer) | Gelatin | 1.33 |
| | Acrylic modified poly(vinyl alcohol) 17% modification | 0.17 |
| Sixth layer (UV absorbing layer) | Gelatin | 0.54 |
| | Ultraviolet absorber (h) | 0.20 |
| | Solvent (j) | 0.09 cc |
| Fifth layer (Red sensitive layer) | Silver chlorobromide emulsion (silver bromide content 70% mol %, 0.45μ, variation coefficient 0.12, cubic) | 0.24 |
| | Gelatin | 1.62 |
| | Cyan coupler (k) | 0.38 |
| | Colored image stabilizer (b) | 0.46 |
| | Colored image stabilizer (l) | 0.17 |
| | Colored image stabilizer (m) | 0.03 |
| | Solvent (c) | 0.23 cc |
| Fourth layer (UV absorbing layer) | Gelatin | 1.60 |
| | Ultraviolet absorber (h) | 0.60 |
| | Anti-color mixing agent (d) | 0.05 |
| | Solvent (j) | 0.26 cc |
| Third layer (Green sensitive layer) | Silver chlorobromide emulsion $A_1$-$F_1$, $A_2$-$F_2$, $G_1$-$J_1$, $G_2$-$J_2$ | 0.18 |
| | Gelatin | 1.80 |
| | Magenta coupler (e) | 0.35 |
| | Colored image stabilizer (f) | 0.20 |
| | Colored image stabilizer (m) | 0.10 |
| | Colored image stabilizer (n) | 0.07 |
| | Solvent (g) | 0.45 cc |
| Second layer (Anti-color mixing layer) | Gelatin | 0.99 |
| | Anti-color mixing agent (d) | 0.08 |
| | Solvent (j) | 0.09 cc |
| First layer (Blue sensitive layer) | Silver chlorobromide emulsion (silver bromide content 80 mol %, 0.81μ, variation coefficient 0.10, cubic) | 0.27 |
| | Gelatin | 1.86 |
| | Yellow coupler (a) | 0.85 |
| | Colored image stabilizer (b) | 0.15 |
| | Solvent (c) | 0.31 cc |
| Support | Polyethylene laminated paper ($TiO_2$ (3.0 $g/m^2$) and ultramarine were included in the polyethylene on the first layer side) | |

The chlorobromide emulsions are indicated in terms of the weight calculated as silver.

These samples were subjected to pressure by folding and then they are exposed for 0.5 seconds through an optical wedge, after which they were processed in the way indicated below. The results obtained were as shown in Table 5.

| Processing | | |
|---|---|---|
| Process | Temperature (°C.) | Time |
| Color development | 37 | 3 min. 30 sec. |
| Bleach-fix | 33 | 1 min. 30 sec. |
| Water wash | 24 to 34 | 3 min. |
| Drying | 80 | 1 min. |

The compositions of the processing baths were as indicated below.

| Color Development Bath | |
|---|---|
| Water | 800 ml |
| Diethylenetriamine penta-acetic acid | 3.0 g |
| Benzyl alcohol | 15 ml |
| Diethyleneglycol | 10 ml |
| Sodium sulfite | 2.0 g |
| Potassium bromide | 1.0 g |
| Potassium carbonate | 30.0 g |
| N-Ethyl-N-(β-methanesulfonamidoethyl)-3-methyl-4-aminoaniline sulfate | 4.5 g |
| Hydroxylamine sulfate | 4.0 g |
| Fluorescent whitener (4,4'-diamino-stilbene based) | 1.0 g |
| Water | to make up to 1000 ml |
| pH (25° C.) | 10.10 |
| Bleach-fix Bath | |
| Water | 400 ml |
| Ammonium thiosulfate (70% solution) | 150 ml |
| Sodium sulfite | 18 g |

-continued

| Color Development Bath | |
|---|---|
| Ethylenedamine tetra-acetic acid, iron(III) ammonium salt | 55 g |
| Ethylenediamine tetra-acetic acid, disodium salt | 5 g |
| Water | to make up to 1000 ml |
| pH (25° C.) | 6.70 |
| Water Wash Bath | |
| Ion exchanged water (Ca++, Mg++ each about 1 ppm) | |

Speed was taken to be the reciprocal of the exposure required to give a density of fog +1.0.

The numerical values for the samples $u_1$ to $u_{12}$ represent relative values taking the value for sample $u_1$ to be 100. The numerical values for samples $v_1$ to $v_8$ are relative values taking the value for $v_1$ to be 100.

Gamma represents the slope of a straight line joining densities of 0.8 and 1.8.

Pressure desensitization is represented by the change in density at the point of fog +1.0 relative to the density when no pressure had been applied.

It is clear from the results shown in table 5 that the samples of this invention were superior overall in respect of speed, gamma and pressure characteristics.

TABLE 5

| Sample | Speed | Fogging | Gamma | Pressure Desensitization | Pressure Fogging | Remarks |
|---|---|---|---|---|---|---|
| $u_1$ | 100 | 0.08 | 1.90 | 97 | 0.25 | Comparative Example |
| $u_2$ | 116 | 0.08 | 2.44 | 100 | 0.08 | Comparative Example |
| $u_3$ | 85 | 0.08 | 2.40 | 100 | 0.29 | Comparative Example |
| $u_4$ | 103 | 0.08 | 2.37 | 100 | 0.09 | Comparative Example |
| $u_5$ | 80 | 0.08 | 2.49 | 94 | 0.08 | Comparative Example |
| $u_6$ | 120 | 0.08 | 2.49 | 90 | 0.08 | Comparative Example |
| $u_7$ | 97 | 0.08 | 2.13 | 98 | 0.13 | Comparative Example |
| $u_8$ | 120 | 0.08 | 2.90 | 100 | 0.08 | This Invention |
| $u_9$ | 80 | 0.08 | 2.38 | 100 | 0.17 | Comparative Example |
| $u_{10}$ | 107 | 0.08 | 2.47 | 100 | 0.08 | This Invention |
| $u_{11}$ | 126 | 008 | 2.81 | 97 | 0.08 | This Invention |
| $u_{12}$ | 126 | 0.08 | 2.63 | 95 | 0.08 | Comparative Example |
| $v_1$ | 100 | 0.08 | 2.22 | 92 | 0.38 | Comparative Example |
| $v_2$ | 107 | 0.08 | 2.39 | 98 | 0.11 | Comparative Example |
| $v_3$ | 115 | 0.08 | 2.48 | 100 | 0.08 | Comparative Example |
| $v_4$ | 120 | 0.08 | 2.63 | 100 | 0.08 | Comparative Example |
| $v_5$ | 93 | 0.08 | 2.32 | 96 | 0.22 | Comparative Example |
| $v_6$ | 110 | 0.08 | 2.46 | 100 | 0.09 | This Invention |
| $v_7$ | 112 | 0.08 | 2.73 | 100 | 0.08 | This Invention |
| $v_8$ | 121 | 0.08 | 2.85 | 100 | 0.08 | This Invention |

EXAMPLE 8

Samples in which the red sensitive emulsion in the samples prepared in Example 7 was replaced by the emulsions $R_1$, $S_1$, $T_1$, $S_2$, $T_2$ used in Example 4 were prepared. The samples in which the emulsions $R_2$, $S_2$ and $T_2$ had been used had superior pressure characteristics and hardness of gradation.

EXAMPLE 9

Samples in which the emulsions used in the green sensitive layer of the samples prepared in Example 7 and the amounts of silver coated were modified in the way indicated below were prepared

| | |
|---|---|
| Silver chlorobromide emulsion ($u_1$ to $u_{12}$, $v_1$ to $v_8$) | 0.32 g/m$^2$ |
| Gelatin | 1.45 g/m$^2$ |
| Magenta coupler (o) | 0.32 g/m$^2$ |
| Colored image stabilizer (p) | 0.07 g/m$^2$ |
| Colored image stabilizer (f) | 0.13 g/m$^2$ |
| Colored image stabilizer (q) | 0.03 g/m$^2$ |
| Colored image stabilizer (r) | 0.10 g/m$^2$ |
| Solvent (g) | 0.43 g/m$^2$ |

These samples were tested in the same way as in Example 7 and the samples of this invention were superior, exhibiting the same trends as before.

(o)

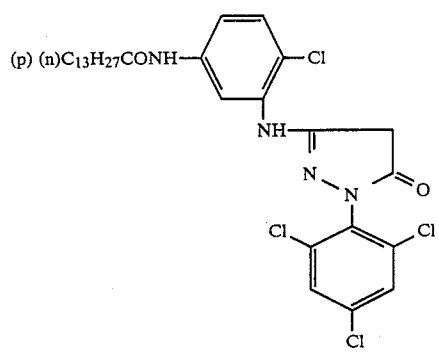

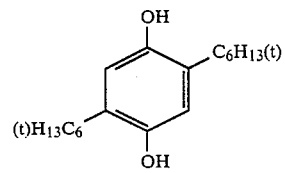

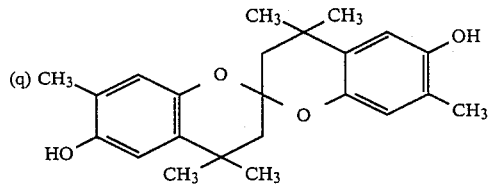

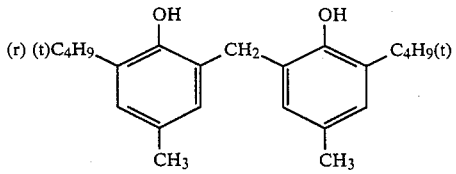

EXAMPLE 10

The samples used in Examples 7, 8 and 9 were processed in the way indicated below. Similar results were obtained in respect of pressure characteristics.

| Process | Processing Temperature (°C.) | Time |
|---|---|---|
| Color development | 37 | 3 min. 30 sec. |
| Bleach-fix | 33 | 1 min. 30 sec. |
| Water wash | 24 to 34 | 3 min. |
| Drying | 80 | 1 min. |

The compositions of the processing baths were as indicated below.

| Color Development Bath | |
|---|---|
| Water | 800 ml |
| Ethylenediamine-N,N,N',N'- tetra-ethylenephosphonic acid | 1.5 g |
| Triethanol | 4 cc |
| 1,4-Diazabicyclo[2,2,2]octane | 3 g |
| N,N-Diethylhydroxylamine oxalate | 3 g |
| Potassium bromide | 1.0 g |
| Potassium carbonate | 30.0 g |
| N-Ethyl-N-(β-methanesulfonamido-ethyl)-3-methyl-4-aminoaniline sulfate | 4.5 g |
| N,N-Bis(carboxymethyl)hydrazine | 4.0 g |
| Fluorescent whitener (4,4'-diamino-stilbene based) | 1.0 g |
| Water | to make up to 1000 ml |
| pH (25° C.) | 10.10 |
| Bleach-fix Bath | |
| Water | 400 ml |
| Ammonium thiosulfate (70% solution) | 150 ml |
| Sodium sulfite | 18 g |
| Ethylenediamine tetra-acetic acid, iron(III) ammonium salt | 55 g |
| Ethylenediamine tetra-acetic acid, disodium salt | 5 g |
| Ammonium bromide | 20 g |
| Water | to make up to 1000 ml |
| pH (25° C.) | 6.70 |
| Water Wash Bath | |
| Ion exchanged water (Ca++, Mg++ each about 1 ppm) | |

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising a support having thereon at least one emulsion layer containing an essentially silver iodide free silver chloride, silver bromide or silver chlorobromide emulsion obtained: (1) by recrystallization of from 0.3 to 15 mol % of total silver halide using fine crystals of a sparingly soluble bromide, chloride or chlorobromide under conditions in which at least one of a simple cyanine dye, a carbocyanine dye or a dicarbocyanine dye is present on the surface of the silver halide grains in a silver halide emulsion which has a grain size distribution such that the variation coefficient is not more than 0.25, and (2) by chemical sensitization.

2. The silver halide photographic material claimed in claim 1, wherein the sparingly soluble bromides, chlorides or chlorobromides have a solubility of not more than 1 gram in 100 grams of water at 20° C.

3. The silver halide photographic material claimed in claim 2, wherein the solubility is not more than 0.2 gram in 100 grams of water at 20° C.

4. The silver halide photographic material claimed in claim 1, wherein the recrystallization is from 0.6 to 12 mol %.

5. The silver halide photographic material claimed in claim 1, wherein the recrystallization is from 0.6 to 9 mol %.

6. The silver halide photographic material claimed in claim 1, wherein the recrystallization is from 0.6 to 6 mol %.

7. The silver halide photographic material claimed in claim 1, wherein the simple cyanine dye, carbocyanine or dicarbocyanine dye is represented by the formula (I)

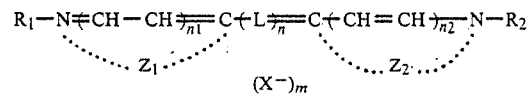

Wherein L represents a methine group or a substituted methine group, $R_1$ and $R_2$ each represents an alkyl or a substituted alkyl group, $Z_1$ and $Z_2$ each represents a group of atoms which forms a nitrogen containing 5 or 6 membered heterocyclic nucleus, X represents an anion, n represents 1, 3 or 5, $n_1$ and $n_2$ represent 1 or 2, provided that $n_1=n_2=0$ when $n=5$ and that $n_1$ or $n_2=0$ when $n=3$, and m represents 0 or 1, provided that m represents 0 when an intramolecular salt is formed, and further provided that when n is 5, the groups represented by L can be joined together to form a substituted or unsubstituted 5 or 6 membered ring.

8. The silver halide photographic material claimed in claim 7, wherein $R_1$ and $R_2$ each represents an ethyl group, a propyl group, a butyl group, a pentyl group, a sulfoethyl group, a sulfopropyl group, a sulfobutyl group, and a sulfopentyl group.

9. The silver halide pholographic material claimed in claim 7, wherein $Z_1$ and $Z_2$ each represents a substituted benzoxazole nucleus, a substituted benzothiazole nucleus, and a substituted benzoselenazole nucleus.

10. The silver halide photographic material claimed in claim 7, wherein X represents a bromine ion, an iodine ion, and a p-toluenesulfonic acid anion.

11. The silver halide photographic material claimed in claim 1, wherein the variation coefficient is not more than 0.20.

12. The silver halide photographic material claimed in claim 11, wherein the variation coefficient is not more than 0.15.

13. The silver halide photographic material claimed in claim 12, wherein the variation coefficient is not more than 0.10.

14. The silver halide photographic material claimed in claim 1, wherein the chemical sensitization comprises sulfur sensitization.

15. The silver halide photographic material claimed in claim 1, wherein said sparingly soluble bromide, chloride or chlorobromide is selected from the group consisting of an iridium salt, a gold salt, a mercury salt, a thallium salt, a copper salt, a lead salt, a platinum salt, a palladium salt, and a rhodium salt.

16. The silver halide photographic material claimed in claim 1, wherein said sparingly soluble bromide, chloride or chlorobromide is a mixed crystal of a silver salt with at least one salt consisting of an iridium salt, a gold salt, a mercury salt, a thallium salt, a copper salt, a lead salt, a platinum salt, a palladium salt, and a rhodium salt.

17. The silver halide photographic material claimed in claim 1, wherein said fine crystal is a sparingly soluble chlorobromide and the surface of the silver halide grain which is subjected to recrystallization is a silver chlorobromide.

18. The silver halide photographic material claimed in claim 15, wherein said fine crystal is a sparingly soluble chlorobromide and the surface of the silver halide grain which is subjected to recrystallization is a silver chlorobromide.

19. The silver halide photographic material claimed in claim 1, wherein said fine crystal is a sparingly soluble chlorobromide and the surface of the silver halide grain which is subjected to recrystallization is a silver chloride.

20. The silver halide photographic material claimed in claim 15, wherein said fine crystal is a sparingly soluble chlorobromide and the surface of the silver halide grain which is subjected to recrystallization is a silver chloride.

21. The silver halide photographic material claimed in claim 1, wherein said fine crystal is a sparingly soluble bromide and the surface of the silver halide grain which is subjected to recrystallization is a silver chlorobromide.

22. The silver halide photographic material claimed in claim 15, wherein said fine crystal is a sparingly soluble bromide and the surface of the silver halide grain which is subjected to recrystallization is a silver chlorobromide.

23. The silver halide photographic material claimed in claim 1, wherein said fine crystal is a sparingly soluble chloride and the surface of the silver halide grain which is subjected to recrystallization is a silver chloride or a silver chlorobromide.

24. The silver halide photographic material claimed in claim 15, wherein said fine crystal is a sparingly soluble chloride and the surface of the silver halide grain which is subjected to recrystallization is a silver chloride or a silver chlorobromide.

25. The silver halide photographic material claimed in claim 1, wherein the difference between the silver bromide content of the silver halide grain which is subjected to recrystallization and the bromide content of the sparingly soluble fine crystal is at least 10 mol %.

26. The silver halide photographic material claimed in claim 15, wherein the variation coefficient of said emulsion is not more than 0.15.

27. The silver halide photographic material claimed in claim 16, wherein the variation coefficient of said emulsion is not more than 0.15.

28. The silver halide photographic material claimed in claim 7, wherein said nitrogen containing heterocyclic nuclei formed by $Z_1$ or $Z_2$ include an oxazole nucleus, a thiazole nucleus, a selenazole nucleus, an imidazole nucleus, a pyridine nucleus, an oxazoline nucleus, a thiazoline nucleus, a selenazoline nucleus, an imidazoline nucleus and those nuclei in which these nuclei are condensed with a benzene ring, a naphthalene ring or other saturated or unsaturated carbocyclic ring, and a substituent group can be bonded onto these heterocyclic rings as a substituent group.

* * * * *